(12) United States Patent
Huang et al.

(10) Patent No.: US 12,101,158 B2
(45) Date of Patent: Sep. 24, 2024

(54) BEAM FAILURE RECOVERY METHOD, TERMINAL AND BASE STATION

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 499 days.

(21) Appl. No.: 17/423,438

(22) PCT Filed: Jan. 7, 2020

(86) PCT No.: PCT/CN2020/070635
§ 371 (c)(1),
(2) Date: Jul. 15, 2021

(87) PCT Pub. No.: WO2020/147615
PCT Pub. Date: Jul. 23, 2020

(65) Prior Publication Data
US 2022/0131591 A1 Apr. 28, 2022

(30) Foreign Application Priority Data
Jan. 16, 2019 (CN) .......................... 201910041785.X

(51) Int. Cl.
*H04B 7/06* (2006.01)
*H04L 5/00* (2006.01)
(Continued)

(52) U.S. Cl.
CPC ......... *H04B 7/0695* (2013.01); *H04L 5/0051* (2013.01); *H04W 16/28* (2013.01); *H04W 24/08* (2013.01); *H04W 76/19* (2018.02)

(58) Field of Classification Search
CPC .... H04B 7/0695; H04W 76/19; H04W 16/28; H04W 24/08; H04L 5/0051
See application file for complete search history.

(56) References Cited

U.S. PATENT DOCUMENTS

2018/0279286 A1  9/2018 Akoum et al.
2020/0403682 A1* 12/2020 Koskela ................ H04W 80/02
(Continued)

FOREIGN PATENT DOCUMENTS

CN  108513737 A   9/2018
CN  108882327 A  11/2018
(Continued)

OTHER PUBLICATIONS

R1-1811853 Intel "Summary on SCell BFR and Beam Measurement" 3GPP WG1 #94b Chengdu Oct. 8-12, 2018 (Year: 2018).*
(Continued)

*Primary Examiner* — Basil Ma
(74) *Attorney, Agent, or Firm* — Ladas & Parry, LLP

(57) ABSTRACT

A beam failure recovery method, a terminal, and a base station are provided. The method includes monitoring a beam failure event according to a reference signal for monitoring a beam failure of a secondary serving cell; reporting the beam failure event to a base station and/or sending a beam failure recovery message to a base station when the beam failure event is detected.

18 Claims, 2 Drawing Sheets

Receiving a beam failure event reported by a terminal when the beam failure event is detected according to a reference signal for monitoring a beam failure of a secondary serving cell and/or receiving a beam failure recovery message sent by a terminal when the beam failure event is detected according to a reference signal for monitoring a beam failure of a secondary serving cell ~301

(51) Int. Cl.
*H04W 16/28* (2009.01)
*H04W 24/08* (2009.01)
*H04W 76/19* (2018.01)

(56) References Cited

U.S. PATENT DOCUMENTS

| | | | |
|---|---|---|---|
| 2021/0021320 A1* | 1/2021 | Koskela | H04B 7/088 |
| 2021/0044344 A1 | 2/2021 | Jiang | |
| 2021/0105850 A1* | 4/2021 | Bai | H04B 7/0695 |

FOREIGN PATENT DOCUMENTS

| | | | |
|---|---|---|---|
| WO | 20181750668 A1 | 9/2018 | |
| WO | 2018237400 A1 | 12/2018 | |

OTHER PUBLICATIONS

European Search Report for European Patent Application 20 74 1308.9, issued Feb. 11, 2022.
"Beam Recovery procedures" 3GPP TSG RAN WG1 Meeting #92, R1-1802824, Athens, Greece, Feb. 26-Mar. 2, 2018 Agenda Item: 7.1.2.2.4 Source: Qualcomm Incorporated.
"Summary on SCell BFR and BEAM Measurement" 3GPP TSG RAN WG1 #94b, R1-1811853, Chengdu, China, Oct. 8-12, 2018 Agenda Item: 7.2.8.3 Source: Intel Corporation.
Spreadtrum Communications, "Discussion on multi-beam operation", R1-1811002, 3GPP TSG RAN WG1 Meeting #94bis, Chengdu, China, Oct. 8-12, 2018, all pages.
Spreadtrum Communications, "Discussion on multi-beam operation", R1-1813067, 3GPP TSG RAN WG1 Meeting #95, Spokane, USA, Nov. 12-16, 2018, all pages.
First Office Action and Search Report from corresponding CN app. No. 201910041785.X, dated Mar. 22, 2021, with English translation from Global Dossier, all pages.
International Search Report from PCT/CN2020/070635, dated Mar. 27, 2020, with English translation from WIPO, all pages.
Written Opinion of the International Searching Authority from PCT/CN2020/070635, dated Mar. 27, 2020, with English translation from WIPO, all pages.
International Preliminary Report on Patentability from PCT/CN2020/070635, dated Jun. 16, 2021, with English translation from WIPO, all pages.
Office action from corresponding European Patent Application No. 20741308.9 dated May 3, 2024.
VIVO: "Discussion on Multi-Beam Operation", 3GPP Draft; R1-1900138_DISCUSSION On Multi-Beam Operation, 3RD Generation Partnership Project (3GPP), Mobile Competence Centre; 650, Route Des Lucioles; F-06921 Sophia-Antipolis Cedex; France, vol. RAN WG1, No. Taipei; Jan. 21, 2019-Jan. 25, 2019, Jan. 12, 2019 (Jan. 12, 2019), XP051575762.
Huawei et al.: "Remaining issues on beam failure recovery", 3GPP Draft; R1-1801454, 3RD Generation Partnership Project (3GPP), Mobile Competence Centre; 650, Route Des Lucioles; F-06921 Sophia-Antipolis Cedex; France, vol. Ran WG1, No. Athens, Greece; 2018-02-26 - 2018-03-02, Feb. 16, 2018 (2018-02-16), XP051397418.

* cited by examiner

BEAM FAILURE RECOVERY METHOD, TERMINAL AND BASE STATION

CROSS-REFERENCE TO RELATED APPLICATIONS

This application is a U.S. national phase application of PCT Application No. PCT/CN2020/070635 filed on Jan. 7, 2020, which claims a priority to Chinese Patent Application No. 201910041785.X filed on Jan. 16, 2019, the disclosures of which are incorporated in their entireties by reference herein.

TECHNICAL FIELD

The present disclosure relates to the field of communications technologies, in particular, relates to a beam failure recovery method, a terminal and a base station.

BACKGROUND

With low-frequency-band resources becoming scarce, a millimeter wave frequency band has more spectrum resources and can provide a larger bandwidth, and thus becomes an important frequency band for a future application of a mobile communication system. The millimeter wave frequency band has a propagation characteristics, such as a higher propagation loss, poorer reflection and diffraction performances, and the like, different from that of a conventional low frequency band since the millimeter wave frequency band has a shorter wavelength. Therefore, a more massive antenna array is usually used to generate beamformed beams having a larger gain, overcome the propagation loss and ensure a system coverage.

Since a wavelength of the millimeter wave antenna array is shorter and a spacing between antenna elements and an aperture of an antenna element are smaller, more physical antenna elements are integrated in a two-dimensional antenna array of a finite size; meanwhile, due to a limited size of the millimeter wave antenna array, considering complexity of hardware, costs and power consumption, it is impossible to adopt a digital beamforming method used in the low frequency band. Instead, a hybrid beamforming method which combines an analog beam and limited digital ports is usually adopted.

Specifically, for a system architecture of the hybrid beamforming, it is assumed that a transmitting end has NT antennas and a receiving end has NR antennas, each of the antennas has an individual radio frequency channel and only K digital channels, and K is smaller than both NT and NR.

Each antenna in a multi-antenna array has an independent radio frequency channel, but shares a same digital channel, and each radio frequency link allows independent adjustment to an amplitude or a phase of a transmitted signal, a formed beam is mainly realized by adjustment to the phase and the amplitude in the RF channel, and is called an analog beamforming signal. Each antenna in a full digital beamforming antenna array has an independent digital channel, which can control the amplitude and the phase of a signal in each channel in a baseband.

Specifically, the analog beamforming has the following characteristics.

First, in the analog beamforming, a phase of a signal transmitted by each antenna is generally changed by a phase shifter;

Second, due to a limitation of capability of a device, the analog beamforming is performed on an entirety of a bandwidth, and it is impossible to perform digital beamforming on part of sub-bands separately. Thus, the analog beamforming is multiplexed in a time division (TDM) manner.

Because of these characteristics, beamforming flexibility of the analog beamforming is lower than that of the digital beamforming. However, because a digital link required by an antenna array in the analog beamforming is much lower than that for an antenna array in the digital beamforming, costs for the antenna array in the analog beamforming is significantly reduced when the number of antennas becomes large.

A structure of the hybrid beamforming balances between the flexibility of digital beamforming and the low complexity of analog beamforming, and has an ability to support multiple data streams and multiple users simultaneously. At the same time, complexity is controlled to be within a reasonable range, and thus, the hybrid beamforming becomes a widely adopted millimeter wave transmission manner and a most important transmission manner of a 5G NR system.

For a system adopting transmission in a high frequency band, a downlink control channel (PDCCH) for the transmission may adopt the analog beamforming to achieve a higher beamforming gain and a larger coverage. Radio resources for the PDCCH are semi-statically divided into a plurality of Control Resource Sets (CORESETs), each CORESET contains radio resources of a plurality of PDCCH channels. A base station may semi-statically match one transmission beam direction for each CORESET, and different CORESETs may match beams of different directions. Moreover, the base station may perform dynamic switching among different CORESETs, so as to realize dynamic switching of the beams. When transmitting the PDCCH, the base station may select a CORESET of an appropriate beam direction according to information of a terminal. At the receiving end, the terminal performs blind detection within configured multiple CORESETs. For each candidate CORESET, the terminal will receive a signal using a reception beam corresponding to a transmission beam for the CORESET.

However, an important challenge for the analog beamforming in the high frequency band is that a propagation loss of transmitting a signal is large and a probability that the signal is blocked is high. For a blocked PDCCH, the terminal cannot accurately obtain the downlink control information, so that performance of receiving decreases, for example, a transmission rate decreases, a latency for scheduling increases, and experience of a user decreases. One of methods to reduce the probability of being blocked is to configure beams of multiple directions for a CORESET, so that a PDCCH channel can be transmitted in multiple directions to avoid the problem of link unreliability caused by occlusion in a certain direction.

However, adopting the above method brings a new problem in that the number of CORESETs allocated to the terminal in various directions is reduced because a blind detection capability of the terminal for the PDCCH channel is limited. For example, in a NR standard (Rel-15), it is restricted that each terminal is configured with a maximum of 3 CORESETs in a same activated Bandwidth Part (BWP). In theory, if an angle of a transmission beam is spread to be wide enough to cover an area of an angular coverage of an entirety of a cell, the problem of beam being blocked will not occur. However, in order to obtain a higher beamforming gain, an angle of the coverage of a beam is usually smaller and the beam is narrower. Therefore, considering the limited number of CORESETs and the characteristics of a narrower beam, in millimeter wave communication in the high frequency band, an angular coverage of a control channel is limited, which tends to cause a coverage blank area of the control channel, and reliable reception of the control channel cannot be guaranteed.

If as the case in a LTE communication system, a condition that all downlink beams configured for the control channel fail is considered to be failure of a radio link, and a radio link re-establishment procedure is started, then in addition to the latency is increased, and it is also possible to waste resources because reception quality of a downlink control signal may be satisfied by replacing a transmission beam and/or a reception beam. In order to avoid such resource waste and latency, a fast and reliable beam failure detection and recovery procedure is standardized in the NR standard, so that a network side can quickly recover a transmission procedure from beam failure.

However, a Beam Failure Recovery (BFR) mechanism of the NR system in the related art can only be performed on a primary serving cell (PCell). When to UE performs carrier aggregation, a secondary serving cell (SCell) is often configured to operate in a high frequency band, and therefore the beam failure recovery is also required to be performed on the SCell. However, in the related art, only when a physical (PHY) layer of a terminal detects that all beams of the PCell fail, a beam failure event is reported to a Medium Access Control (MAC) layer. That is, beam failure monitoring is performed only for the PCell in the related art.

SUMMARY

The present disclosure provides a beam failure recovery method, a terminal and a base station, and solves the problem in the related art that beam failure monitoring cannot be performed on a SCell.

An embodiment of the present disclosure provides a beam failure recovery method. The method includes: monitoring a beam failure event according to a reference signal for monitoring a beam failure of a secondary serving cell; reporting the beam failure event to a base station and/or sending a beam failure recovery message to a base station when the beam failure event is detected.

An embodiment of the present disclosure also provides a beam failure recovery method. The method includes receiving a beam failure event reported by a terminal when the beam failure event is detected according to a reference signal for monitoring a beam failure of a secondary serving cell and/or receiving a beam failure recovery message sent by a terminal when the beam failure event is detected according to a reference signal for monitoring a beam failure of a secondary serving cell.

An embodiment of the present disclosure also provides a terminal. The terminal includes a first transceiver, a first storage, a first processor and a program stored on the first storage and executable by the first processor, wherein the first processor is configured to execute the program to perform following: monitoring a beam failure event according to a reference signal for monitoring a beam failure of a secondary serving cell; and reporting the beam failure event to a base station and/or sending a beam failure recovery message to a base station when the beam failure event is detected by the first processor.

An embodiment of the present disclosure also provides a base station. The base station includes a second transceiver, a second storage, a second processor and a program stored on the second storage and executable by the second processor, wherein the second processor is configured to execute the program to perform following: receiving a beam failure event reported by a terminal when the beam failure event is detected according to a reference signal for monitoring a beam failure of a secondary serving cell and/or receiving a beam failure recovery message sent by a terminal when the beam failure event is detected according to a reference signal for monitoring a beam failure of a secondary serving cell.

An embodiment of the present disclosure also provides a terminal. The terminal includes a monitoring module, configured for monitoring a beam failure event according to a reference signal for monitoring a beam failure of a secondary serving cell; a reporting module, configured for reporting the beam failure event to a base station and/or sending a beam failure recovery message to a base station when the monitoring module detects the beam failure event.

An embodiment of the present disclosure also provides a base station. The base station includes: a first reception module, configured for receiving a beam failure event reported by a terminal when the beam failure event is detected according to a reference signal for monitoring a beam failure of a secondary serving cell and/or receiving a beam failure recovery message sent by a terminal when the beam failure event is detected according to a reference signal for monitoring a beam failure of a secondary serving cell.

An embodiment of the present disclosure also provides a computer-readable storage medium. The computer-readable storage medium includes a computer program stored on the computer-readable storage medium, wherein when the computer program is executed by a processor, the processor implements steps of the beam failure recovery method described above.

Beneficial effects of the embodiments of the present disclosure are as follow.

In the embodiments of the present disclosure, by monitoring a beam failure event according to a reference signal for monitoring a beam failure of a secondary serving cell, and reporting the beam failure event to a base station and/or sending a beam failure recovery message to a base station when the beam failure event is detected, beam failure monitoring on the secondary serving cell. Thus, a probability of radio link failure in the secondary serving cell may be reduced, and the secondary serving cell may be quickly recovered from beam failure, and performance of a network and a system is improved.

DETAILED DESCRIPTION

Figure 1:
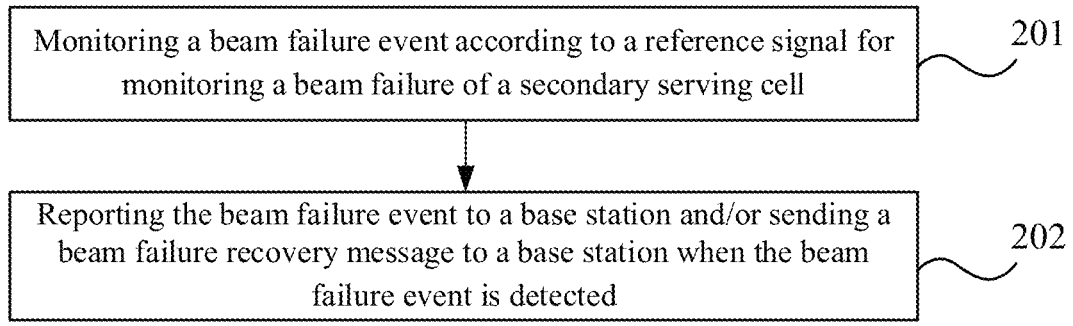
FIG. 1 shows a flowchart of a beam failure recovery method of a first embodiment of the present disclosure.

In order to make technical problems to be solved by the present disclosure, technical solutions and advantages more clear, a detailed description will be given below with reference to drawings and specific embodiments. In the following description, specific details, such as specific configurations and components, are provided merely to facilitate thorough understanding of the embodiments of the present disclosure. Accordingly, it will be apparent to those skilled in the art that various changes and modifications may be made to the embodiments described herein without departing from the scope and the spirit of the present disclosure. In addition, description of known functions and configuration are omitted for clarity and conciseness.

It should be understood that reference to "one embodiment" or "an embodiment" throughout the specification means that a particular feature, structure, or characteristic associated with an embodiment is included in at least one embodiment of the present disclosure. Accordingly, reference to "in one embodiment" or "in an embodiment" appearing throughout the specification do not necessarily refer to the same embodiment. Furthermore, these particular features, structures, or characteristics may be combined in any suitable manner in one or more embodiments.

In various embodiments of the present disclosure, it should be understood that values of sequence numbers of the following steps do not imply an order of executing the steps, the order of executing the steps should be determined by their functions and inherent logic, and should not be construed as any limitation on implementation processes of the embodiments of the present disclosure.

In addition, such term as "system" and "network" herein are often used interchangeably herein.

In the embodiments provided herein, it should be understood that "B corresponding to A" means that B is associated with A, indicating that B may be determined according to A or at least part of characteristics of B may be determined according to A or A may be determined according to B or at least part of characteristics of A may be determined according to B. However, it should also be understood that determining B according to A does not mean that B is determined according to A alone, B may also be determined according to A and/or other information, the same applies to determining at least part of the characteristics of B according to A or determining A according to B or determining at least part of the characteristics of A according to B.

Techniques described herein are not limited to Long Time Evolution (LTE)/LTE-Advanced (LTE-A) and NR systems, and the present disclosure may also be used in various wireless communication systems, such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA) and other systems. The terms "system" and "network" are often used interchangeably. The CDMA system may implement radio technologies such as CDMA2000, Universal Terrestrial Radio Access (UTRA), and the like. UTRA includes Wideband Code Division Multiple Access (WCDMA) and other CDMA variants. The TDMA system may implement a radio technology such as Global System for Mobile Communication (GSM). The OFDMA system may implement radio technologies such as Ultra Mobile Broadband (UMB), Evolution-UTRA (E-UTRA), IEEE 802.11 (Wi-Fi), IEEE 802.16 (WiMAX), IEEE 802.20, and Flash-OFDM. UTRA and E-UTRA are part of the Universal Mobile Telecommunications System (UMTS). LTE and more advanced LTE, such as LTE-A, are new UMTS versions that use E-UTRA. NR, UTRA, E-UTRA, UMTS, LTE, LTE-A and GSM are described in literature from an organization named 3rd Generation Partnership Project (3GPP). CDMA2000 and UMB are described in literature from an organization named 3rd Generation Partnership Project 2 (3GPP2). The techniques described herein may be used for both the systems and the radio technologies mentioned above and for other systems and radio technologies. However, the following description describes the NR system for example purposes, and NR terminology is used in most of the following description, although these techniques are also applicable to applications other than NR system applications.

In the embodiments of the present disclosure, forms of an access network are not limited, and may include access networks such as a Macro Base Station, a Pico Base Station, a Node B (a name for 3G mobile base station), an enhanced base station (eNB), a home enhanced base station (Femto eNB, Home eNode B, Home eNB or HeNB), a relay station, an access point, an RRU (Remote Radio Unit), and an RRH (Radio Remote Head). The base station may be a base station (e.g. gNB, 5G NR NB, etc.) of a 5G and later version or a base station in other communication systems (e.g. eNB, WLAN access point, or other access point, etc.), wherein, a base station may be referred to as a Node B, an evolved Node B, an access point, a Base Transceiver Station (BTS), a radio base station, a radio transceiver, a Basic Service Set (BSS), an Extended Service Set (ESS), a Node B, an evolved Node B (eNB), a home Node B, a home evolved Node B, a WLAN access point, a WiFi node or some other suitable terminology in the field, as long as the same technical effect is achieved, the base station is not limited to a specific technical word. It should be noted that in the embodiments of the present disclosure, only the base station in the NR system is taken as an example, but a specific type of the base station is not limited. The user terminal may be a mobile telephone (or handset), or other device capable of sending or receiving radio signals, such as a user equipment, a Personal Digital Assistants (PDA), a wireless modem, a wireless communication device, a handheld device, a laptop computer, a cordless telephone, a wireless local loop (WLL) station, a Customer Premise Equipment (CPE) capable of converting mobile signals into WiFi signals, a mobile intelligent hot spot, an intelligent home appliance, or other equipment capable of communicating with a mobile communication network spontaneously without human operation.

Embodiments of the present disclosure provide a beam failure recovery method, a terminal, and a base station, and solve the problem in the related art that beam failure monitoring for a SCell cannot be performed.

First Embodiment

As shown in FIG. 1, the embodiment of the present disclosure provides a beam failure recovery method. The beam failure recovery method specifically includes the following Steps 201-202.

Step 201: monitoring a beam failure event according to a reference signal for monitoring a beam failure of a secondary serving cell.

The beam failure event includes a first beam failure event in which a reference signal is subjected to a beam failure and/or a second beam failure event in which a beam failure occurs in the secondary serving cell, monitoring the beam failure event by the terminal according to the reference signal for monitoring the beam failure of the secondary serving cell includes: monitoring the first beam failure event by a physical layer of the terminal according to the reference signal for monitoring the beam failure of the secondary serving cell, and reporting the beam failure event to a Media Access Control layer in respect of the reference signal or reporting the beam failure event to the media access control layer in respect of the secondary service cell; or, monitoring the second beam failure event by the physical layer of the terminal according to the reference signal for monitoring the beam failure of the secondary serving cell, and reporting the beam failure event to the media access control layer in respect of the secondary serving cell.

Step 202: when a beam failure event is detected, reporting the beam failure event to a base station and/or transmitting a beam failure recovery message to the base station.

The beam failure recovery message includes at least one of the following information: a beam failure recovery request, a new candidate beam, and a beam quality monitored by the terminal. Optionally, the beam quality is a signal quality of the reference signal for which the terminal detects a beam failure. Optionally, the beam quality is a beam quality of a new candidate beam detected by the terminal. Optionally, in order to enable the terminal to report the new candidate beam, the base station configures a corresponding reference signal resource set for the terminal, and reference signals correspond to a candidate beam set. The terminal determines a transmission-reception beam pair for a transmission link by measuring a set of reference signals. After completing the measurement, the terminal reports the new candidate beam to a network, and the selected new candidate beam needs to meet a performance quality requirement that a RSRP exceeds a threshold or a BLER of a corresponding PDCCH is lower than a certain threshold. Optionally, the beam failure recovery message contains only one new candidate beam. In this way, if quality of a plurality of beams is found to meet the performance quality requirement in a process of the measurement, the terminal may select one of the plurality of beams to report the same to the base station according to judgment by the terminal per se, for example, the strongest beam is reported as the new candidate beam.

The beam failure event in the secondary serving cell may be monitored by monitoring a plurality of beams, one beam may be characterized by a reference signal for monitoring the beam failure of the secondary serving cell, and one secondary serving cell corresponds to a plurality of reference signals for monitoring the beam failure of the secondary serving cell.

Optionally, one of the reference signals may be simultaneously used for beam-failure-monitoring for at least two different serving cells.

If a reference signal can be used for beam failure monitoring for a secondary serving cell, it can be considered that the reference signal is associated with the secondary serving cell, that is, there is association relationship between the reference signal and the secondary serving cell in aspect of beam failure monitoring.

That is, one reference signal may also be used for beam-failure-monitoring for at least two different serving cells, i.e., one reference signal may be associated with one or more serving cells. Specifically, for example, one reference signal may be used for beam failure monitoring for two different secondary serving cells, or one reference signal may be used for beam failure monitoring for a primary serving cell and one secondary serving cell.

When a reference signal is used for monitoring beam failure of different serving cells, the terminal can determine the quality of a beam, corresponding to a certain direction, of a plurality of serving cells by monitoring a reference signal. Thus, an overhead of the reference signal and monitoring times of the terminal can be reduced.

For convenience of description, a reference signal for monitoring a beam failure of a serving cell may be defined as a Beam Failure Detection-Reference Signal (BFD-RS). A type of the BFD-RS may be a Synchronization Signal Block (SSB) or a Channel State Information Reference Signal (CSI-RS).

Optionally, the reference signal includes a reference signal, pre-configured by the base station, for monitoring a beam failure of the secondary serving cell and/or a predefined reference signal for monitoring a beam failure of the secondary serving cell.

In particular, the predefined reference signal for monitoring the beam failure of a target secondary serving cell includes a reference signal carried in transmission beam indication information for all control resource sets (CORESET) of a Physical Downlink Control Channel (PDCCH) monitored by the terminal in the target secondary serving cell; and/or a reference signal, in a preset frequency band, for monitoring the beam failure of the secondary serving cell, wherein the preset frequency band is the same as the frequency band of the target secondary serving cell.

As can be seen from the above, the BFD-RS may be configured to the terminal through a signaling by the base station (that is, explicit indication), or may be predefined (that is, configured to the terminal through implicit indication by the base station), or may be indicated to the terminal through a combination of explicit indication and implicit indication.

Specifically, the following manners may be adopted for configuration of the BFD-RS.

First Manner: Explicit Indication

The base station configures the BFD-RS to the terminal through a signaling. In addition to a reference signal ID in configuration parameters of the configuration, the configuration parameters may also include a reference signal type (e.g., SSB or CSI-RS) and/or a transmission power and/or a resource indication of a reference signal and/or a reference signal resource.

In such a configuration, each BFD-RS may be associated with one SCell or multiple SCells. In particular, the base station may configure, for each BFD-RS, an identity (ID) of the SCell associated with the BFD-RS.

In addition, in this configuration manner, if the base station configures the BFD-RS for the terminal through a signaling, the terminal determines the BFD-RS corresponding to each SCell according to association relationship between BFD-RSs and SCells. This means that if a BFD-RS associated with a certain SCell does not exist in the BFD-RSs configured by the base station, then the SCell does not have a corresponding BFD-RS.

Second Manner: Implicit Indication

One BFD-RS associated with all SCells within a frequency band in which the BFD-RS is located is predefined, or a BFD-RS set for one SCell may predefined to be derived from the transmission beam indication information (e.g., Transmission Configuration Indication (TCI) state) of a CORESET resource corresponding to the SCell.

The transmission beam indication information of the CORESET resource includes reference signal configuration information. For example, for a CORESET involving analog beamforming transmission, the TCI state will include configuration information of a reference signal with a Quasi-co-location (QCL) type, QCL-TypeD. If the base station does not explicitly configure the BFD-RS for one SCell, then the terminal may measure the reference signal, with the QCL (Quasi co-location) type being the QCL-TypeD in the TCI state configured for the CORESET of the SCell, to determine whether a beam failure occurs. That is, the reference signal (for example, the reference signal with the QCL type being the QCL-TypeD in the TCI state) indicated in the transmission beam indication information of the CORESET resource is the BFD-RS implicitly indicated. Optionally, the implicitly indicated BFD-RS contains only a specific type of reference signal, such as a periodic NZP CSI-RS (Non-Zero Power Channel State Information Reference Signal) among the above reference signals.

In addition, in this configuration, each BFD-RS may optionally be associated with a plurality of SCells. For example, parameter configuration information of a BFD-RS may include an indication signaling for an associated SCell or an associated SCell beam failure event, or association relationship between a reference signal and a SCell is included in the TCI state.

In addition, in this configuration manner, if the base station does not explicitly indicate a BFD-RS for the terminal through a signaling, then the terminal determines the BFD-RS of each SCell through the transmission beam indication information of the CORESET resource corresponding to the SCell. For example, a BFD-RS set of a SCell is a set of reference signals with the QCL (Quasi co-location) type being the QCL-TypeD in the TCI state of the CORESET corresponding to the SCell.

Third Manner: Combination of Explicit Indication and Implicit Indication

The base station may configure a group of BFD-RSs for the terminal through a signaling, and indicate the association relationship between the BFD-RSs and the SCells to the terminal. If a SCell has a BFD-RS associated with the SCell, then the terminal considers that a set of BFD-RSs corresponding to the SCell is a group consisting of all BFD-RSs associated with the SCell; if a SCell does not have a BFD-RS associated with the SCell, then the terminal considers that the BFD-RS set of the SCell is a group consisting of reference signals with the QCL type being the QCL-TypeD in the TCI state of the CORESET corresponding to the SCell. In this configuration manner, the base station can flexibly configure, for a serving cell, a reference signal for monitoring a beam failure event.

Fourth Manner: Combination of Explicit Indication and Implicit Indication

The BFD-RS set of one SCell is the sum of BFD-RSs associated with the SCell in the BFD-RSs configured by the base station for the terminal through a signaling and reference signals with the QCL type being the QCL-TypeD in the TCI state of the CORESET corresponding to the SCell. In this configuration manner, beams in which whether a beam failure occurs is monitored include candidate beams that can be used by a current PDCCH, and the base station may further configure the terminal to monitor more beam directions.

In addition, in this configuration manner, the base station can more flexibly change a transmission beam corresponding to the CORESET, for example, the base station can indicate, to a terminal through a dynamic signaling, that a transmission beam corresponding to a CORESET is a transmission beam of a BFD-RS configured by the base station. In this manner, even if a beam corresponding to a TCI state of a CORESET fails, the base station can still transmit the PDCCH using a transmission beam corresponding to the BFD-RS not subjected to the beam failure.

In addition, when the base station configures the BFD-RS for the terminal, the configuration may be specifically performed in the following manners.

First manner: optionally, before monitoring the beam failure event according to the reference signal for monitoring the beam failure of the secondary serving cell, the method further includes: receiving configuration information, sent by the base station, of the reference signal for monitoring the beam failure of the serving cell; wherein the configuration information includes correspondence relationship between different serving cells and reference signals for monitoring the beam failure of the serving cells. Correspondence relationship between a serving cell and a reference signal means that the reference signal is used for monitoring the beam failure of the serving cell.

Further, the configuration information further includes parameter information of the reference signal for monitoring the beam failure of the serving cell.

It should be noted that one case is that the serving cells herein include the primary serving cell and the secondary serving cell, and the other case is that the serving cells herein only include the secondary serving cells.

That is, the base station directly sends the correspondence relationship between different cells and the BFD-RSs to the terminal, so that the terminal can determine the reference signal for monitoring the beam failure of each cell according to the correspondence relationship when the terminal receives the correspondence relationship. Specific parameter information of all the BFD-RSs can also be sent to the terminal together with the above correspondence relationship.

Optionally, the configuration information includes at least one of the following: configuration information of a reference signal, transmitted on each of at least a portion of M SCells, for monitoring the beam failure; beam-failure-monitoring association relationship between a reference signal and a serving cell (i.e., a Cell).

If the configuration information includes configuration information of the reference signal, transmitted on each of at least a portion of M SCells, for monitoring the beam failure, then, for each of at least a portion of the M SCells, the reference signal, transmitted on each of at least a portion of M SCells, for monitoring the beam failure may be used as the reference signal for monitoring the beam failure of the SCell, in order to realize the BFR on the SCell.

If the configuration information includes the beam-failure-monitoring association relationship between the reference signal and the Cell, then according to the beam-failure-monitoring association relationship, for the Cell, the reference signal associated with the Cell is the reference signal for monitoring the beam failure of the Cell, so as to realize the BFR on the Cell.

It can be seen that, in this embodiment, according to the configuration information, the reference signal for performing beam failure monitoring of the SCell can be determined very conveniently.

Optionally, the beam-failure-monitoring association relationship between the reference signal and the serving cell indicates: for a Cell, the reference signal used when performing the beam failure monitoring; or, for the reference signal, the Cell using the reference signal for performing the beam failure monitoring.

If the beam-failure-monitoring association relationship indicates, for the Cell, the reference signal used when performing the beam failure monitoring, then the number of reference signals used when performing the beam failure monitoring for each Cell may be one or more (i.e., at least two). In this manner, optionally, the base station may send a beam-failure-monitoring reference signal list for a cell, and all reference signals in the list are reference signals used for performing the beam failure monitoring for the Cell.

If the beam-failure-monitoring association relationship indicates, for the reference signal, the Cell using the reference signal for performing the beam failure monitoring, then, for each reference signal, the number of cells using the reference signal for performing the beam failure monitoring may be one or more (i.e., at least two). In this manner, optionally, for one reference signal, the base station may indicate a Cell (the Cell having the beam-failure-monitoring association relationship with this reference signal) using the reference signal for performing the beam failure detection. If a reference signal is indicated with the Cell with which the beam-failure-monitoring association relationship is associated, then the reference signal is a reference signal for beam failure monitoring.

For example, the beam-failure-monitoring association relationship may be used to indicate that for Cell 1, the reference signal used by Cell 1 for beam failure monitoring is a reference signal S11; for Cell 12, the reference signal used by the Cell 12 for beam failure monitoring is a reference signal S12; and for Cell 13, the reference signal used by the Cell 13 for beam failure monitoring is a reference signal S13. It is easy to see that in this indication manner, the terminal can determine the association relationship between the reference signal and the cell very conveniently by directly indicating the reference signal used when the cell performs beam failure monitoring.

In another example, the beam-failure-monitoring association relationship may be use to indicate that, for a reference signal S21, the Cell using the reference signal S21 for beam failure monitoring is Cell 4; for a reference signal S22, the Cell using the reference signal for beam failure monitoring is Cell 5; and for a reference signal S23, the Cell using the reference signal for beam failure monitoring is Cell 6. It is easy to see that in this indication manner, the terminal can easily determine the association relationship between the reference signal and the cell by indicating use of the reference signal.

Second manner: optionally, before monitoring the beam failure event according to the reference signal for monitoring the beam failure of the secondary serving cell, the method further includes: receiving configuration information, sent by the base station, of the reference signal for monitoring the beam failure of a serving cell, wherein the configuration information includes parameter information of reference signals, corresponding to different serving cells, for monitoring the beam failure of the serving cells.

That is, the base station directly configures parameter information of corresponding BFD-RSs for different SCells, so that the terminal can monitor the beam failure event directly according to the parameter information of the BFD-RSs configured for different SCells by the base station.

Optionally, for a SCell to which a network side device configures correspondingly a reference signal for performing beam failure monitoring, the reference signal for beam failure monitoring is a reference signal, transmitted on the SCell, for performing the beam failure monitoring. In this manner, the base station may configure, for a SCell, a set of reference signals for beam failure monitoring transmitted on the SCell, and these reference signals for beam failure monitoring are all reference signals for beam failure monitoring in this SCell.

In this way, the reference signal for beam failure monitoring in the SCell can effectively reflect a beam quality of a beam on the SCell, thereby ensuring accuracy of a monitoring result obtained through beam failure monitoring.

Difference between the first manner and the second manner is that, in the first manner, correspondence relationship between different cells and BFD-RS is established, and the base station determines, based on configuration of a reference signal, a cell which uses the reference signal for beam failure monitoring. This cell can be either a SCell or a PCell, or may be a Cell or be multiple cells; whereas in the second manner, the parameter information of the BFD-RS corresponding to different SCells is directly sent to the terminal, and the terminal can obtain the BFD-RS of the SCell for the configuration of the SCell.

Optionally, monitoring the beam failure event according to the reference signal for monitoring the beam failure of the secondary serving cell includes: when the physical layer of the terminal detects that a signal quality of a second reference signal is lower than a preset quality requirement, reporting, to the medium access control layer, a monitoring result that the second reference signal is subjected to a beam failure event. The second reference signal is one or more of the reference signals for monitoring the beam failure of the secondary serving cell. Optionally, the second reference signal is any one of one or more of the reference signals for monitoring the beam failure of the secondary serving cell.

That is, if the PHY layer detects that the signal quality of a BFD-RS is lower than a preset quality requirement, it indicates that the BFD-RS is subjected to a beam failure event, and the PHY layer sends, to the MAC layer, a monitoring result that the BFD-RS is subjected to the beam failure event. For example, a signal quality can be represented by a block error rate of the PDCCH corresponding to the BFD-RS, the smaller the block error rate is, the better the signal quality is, and when the block error rate of the PDCCH corresponding to the BFD-RS is greater than a certain threshold, it indicates that the BFD-RS is subjected to the beam failure event.

The PHY layer needs to send identification information of the BFD-RS when reporting the beam failure event to the MAC layer, so that the MAC layer knows which BFD-RS subjected to the beam failure event is reported. If this manner is adopted, then the MAC layer can report a beam failure based on one BFD-RS, and the base station can flexibly and rapidly reconfigure the BFD-RS. For example, if the terminal reports that one BFD-RS is subjected to a beam failure even, then the base station may delete the BFD-RS from a BFD-RS list, and may add a new BFD-RS.

It may be known from the above that the PHY layer of the terminal monitors the beam failure event and then reports a result of the beam failure monitoring to the MAC layer, and when the PHY layer reports the result of the beam failure monitoring to the MAC layer, the reporting is made in respect of the BFD-RS.

Some possible ways of judging that the signal quality of the reference signal is lower than the preset quality requirement are as follows: a RSRP estimated according to the reference signal is lower than a predetermined threshold; or a BLER of the PDCCH estimated according to the reference signal is higher than a preset threshold, etc.

Correspondingly, reporting the beam failure event to the base station and/or sending the beam failure recovery message to the base station include: reporting the beam failure event to the base station and/or sending the beam failure recovery message to the base station, according to the result of the monitoring reported by the physical layer to the medium access control layer.

Further, reporting the beam failure event to the base station and/or sending the beam failure recovery message to the base station according to the result of monitoring reported by the physical layer to the medium access control layer includes: if the number of beam failure events, detected by the media access control layer of the terminal, to which the second reference signal is continuously subjected reaches a first preset number of times, reporting, by the terminal to the base station, that the second reference signal is subjected to the beam failure and/or sending, by the terminal to the base station, a beam failure recovery message for the second reference signal; or if the number of beam failure events, detected by the media access control layer of the terminal, to which the second reference signal is continuously subjected reaches a first preset number of times, and the terminal monitors that a signal quality of at least one third reference signal meets a preset quality requirement, then reporting, by the terminal to the base station, that the second reference signal is subjected to the beam failure and/or sending, by the terminal to the base station, a beam failure recovery message for the second reference signal, wherein, the third reference signal is a reference signal for performing beam failure recovery.

That is, on the premise that the PHY layer reports the result of beam failure monitoring to the MAC layer in respect of the BFD-RS, the MAC layer may count beam failure events for the BFD-RS, and when the number of beam failure events to which one BFD-RS is continuously subjected reaches the first preset number of times, the terminal reports to the base station that the BFD-RS is subjected to beam failure or sends to the base station a beam failure recovery message for the BFD-RS; or when the terminal further detects that the signal quality of at least one reference signal for beam failure recovery meets a preset quality requirement, the terminal reports to the base station that the BFD-RS is subjected to beam failure or sends to the base station the beam failure recovery message for the BFD-RS.

Further, reporting the beam failure event to the base station and/or sending the beam failure recovery message to the base station, according to the result of the monitoring reported by the physical layer to the medium access control layer includes: if the number of beam failure events, detected by the media access control layer of the terminal, to which the second reference signal is continuously subjected reaches a second preset number of times, reporting, by the terminal to the base station, that a secondary serving cell corresponding to the second reference signal is subjected to the beam failure and/or sending, by the terminal to the base station, a beam failure recovery message for the secondary serving cell corresponding to the second reference signal; or if the number of beam failure events, detected by the media access control layer of the terminal, to which the second reference signal is continuously subjected reaches a second preset number of times, and the terminal monitors that a signal quality of at least one third reference signal meets a preset quality requirement, then reporting, by the terminal to the base station, that a secondary serving cell corresponding to the second reference signal is subjected to the beam failure and/or sending, by the terminal to the base station, a beam failure recovery message for the secondary serving cell corresponding to the second reference signal, wherein, the third reference signal is a reference signal for performing beam failure recovery, i.e., the third reference signal is considered as a reference signal corresponding to a candidate beam and may be used to indicate a candidate beam, and is used by the base station to perform the beam failure recovery for the second reference signal or the secondary serving cell. Optionally, the third reference signal is configured by the base station through a signaling, for example, the base station configures a reference signal resource set for the terminal, and reference signals correspond to a candidate beam set. The reference signals are third reference signals. The terminal measures the reference signals in the reference signal set, and reports information of new candidate beams to the network in a beam recovery message, that is, reports information of candidate beams selected by the terminal and having a communication quality satisfying a preset quality requirement (third reference signals having a signal quality meeting a preset quality requirement). Definitions for the preset quality requirement may be made in many ways, such as a RSRP exceeds a threshold or a BLER of a PDCCH corresponding to the third reference signal is lower than a certain threshold. Optionally, the beam failure recovery message contains only one new candidate beam (an identifier of a third reference signal). In this way, if quality of a plurality of beams is found to meet a performance quality requirement in a process of the measurement, the terminal may select one of the plurality of beams to report the same to the base station according to judgment by the terminal per se, for example, the strongest beam (i.e., a third reference signal having the best signal quality) is reported as the new candidate beam. Optionally, the third reference signals are reference signals determined according to a predefined manner. For example, the third reference signals are reference signals characterizing transmission beams corresponding to CORESETs where candidate PDCCHs carrying a beam failure response are located.

That is, on the premise that the PHY layer reports the result of beam failure monitoring to the MAC layer in respect of the BFD-RS, the MAC layer may count beam failure events for the BFD-RS, and when the number of beam failure events, continuously reported by the PHY layer to the MAC layer, to which one BFD-RS is subjected reaches a second preset number of times, the MAC layer determines that all SCells corresponding to the BFD-RS are subjected to beam failure, and the terminal reports to the base station that all SCells corresponding to the BFD-RS are subjected to beam failure or sends to the base station a beam failure recovery message for all SCells corresponding to the BFD-RS; or when the terminal further detects that the signal quality of at least one reference signal for beam failure recovery meets a preset quality requirement, the terminal reports to the base station that all SCells corresponding to the BFD-RS are subjected to beam failure or sends to the base station the beam failure recovery message for all SCells corresponding to the BFD-RS.

Further, reporting the beam failure event to the base station and/or sending the beam failure recovery message to the base station, according to the result of the monitoring reported by the physical layer to the medium access control layer includes: determining, by the media access control layer of the terminal according to a monitoring result of a beam failure event to which the second reference signal is subjected to, whether a first secondary service cell is subjected to a beam failure event, (optionally, if the number of fourth reference signals subjected to beam failure events is detected by the media access control layer of the terminal to reach a preset number, then it is determined that a first secondary service cell is subjected to one beam failure event, the preset number is less than or equal to a total number of reference signals for monitoring the beam failure of the first secondary serving cell, the fourth reference signals are reference signal for monitoring the beam failure of the first secondary serving cell); if the number of beam failure events, detected by the media access control layer of the terminal, to which the first secondary serving cell is continuously subjected reaches a third preset number of times, reporting, by the terminal to the base station, that the first serving cell is subjected to the beam failure and/or sending, by the terminal to the base station, a beam failure recovery message for the first serving cell; or if the number of beam failure events, detected by the media access control layer of the terminal, to which the first secondary serving cell is continuously subjected reaches a third preset number of times, and the terminal monitors that a signal quality of at least one third reference signal meets a preset quality requirement, then reporting, by the terminal to the base station, that the first secondary serving cell is subjected to the beam failure and/or sending, by the terminal to the base station, a beam failure recovery message for the first secondary serving cell, wherein, the third reference signal is a reference signal for performing beam failure recovery.

Optionally, the third reference signal is configured by the base station through a signaling, for example, the base station configures a reference signal resource set for the terminal, and reference signals correspond to a candidate beam set. The reference signals are third reference signals. The terminal measures the reference signals in the reference signal set, and reports information of new candidate beams to the network in a beam recovery message, that is, reports information of candidate beams selected by the terminal and having a communication quality satisfying a preset quality requirement (third reference signals having a signal quality meeting a preset quality requirement). Definitions for the preset quality requirement may be made in many ways, such as a RSRP exceeds a threshold or a BLER of a PDCCH corresponding to the third reference signal is lower than a certain threshold. Optionally, the beam failure recovery message contains only one new candidate beam (an identifier of a third reference signal). In this way, if quality of a plurality of beams is found to meet a performance quality requirement in a process of the measurement, the terminal may select one of the plurality of beams to report the same to the base station according to judgment by the terminal per se, for example, information of the strongest beam (i.e., a third reference signal having the best signal quality) is reported as the new candidate beam. Optionally, the third reference signals are reference signals determined according to a predefined manner. For example, the third reference signals are reference signals characterizing transmission beams corresponding to CORESETs where candidate PDCCHs carrying a beam failure response are located.

That is, on the premise that the PHY layer reports the result of beam failure monitoring to the MAC layer in respect of the BFD-RS, the MAC layer may count beam failure events for the SCell. Specifically, the MAC layer may count the beam failure events, sent by the PHY, for the BFD-RS. Only if a predefined number (such as 80% or all) of BFD-RSs in BFD-RSs corresponding to one SCell reported by the PHY layer, it is determined that one beam failure event occurs in the SCell. Additionally, when the number of beam failure events to which one SCell is continuously subjected reaches a certain threshold, the MAC layer determines that the SCell is subjected to beam failure, and the terminal reports to the base station that the SCell is subjected to beam failure or sends to the base station a beam failure recovery message for the SCell; or when the terminal further detects that the signal quality of at least one reference signal for beam failure recovery meets a preset quality requirement, the terminal reports to the base station that the SCell is subjected to beam failure or sends to the base station the beam failure recovery message for the SCell.

Further, reporting the beam failure event to the base station and/or sending the beam failure recovery message to the base station, according to the result of the monitoring reported by the physical layer to the medium access control layer includes: if the number of beam failure events, detected by the media access control layer of the terminal, to which a predefined number of fourth reference signals are continuously subjected reaches a fourth preset number of times, reporting, by the terminal to the base station, that a first secondary serving cell is subjected to the beam failure and/or sending, by the terminal to the base station, a beam failure recovery message for the first secondary serving cell; or if the number of beam failure events, detected by the media access control layer of the terminal, to which the predefined number of fourth reference signals are continuously subjected reaches a fourth preset number of times, and the terminal monitors that a signal quality of at least one third reference signal meets a preset quality requirement, then reporting, by the terminal to the base station, that a first secondary serving cell is subjected to the beam failure and/or sending, by the terminal to the base station, a beam failure recovery message for the first secondary serving cell, wherein, the predefined number is smaller than or equal to the total number of reference signals for monitoring the beam failure of the first secondary serving cell, the third reference signal is a reference signal used for performing the beam failure recovery, and the fourth reference signal is a reference signal for monitoring the beam failure of the first secondary serving cell.

Optionally, the third reference signal is configured by the base station through a signaling, for example, the base station configures a reference signal resource set for the terminal, and reference signals correspond to a candidate beam set. The reference signals are third reference signals. The terminal measures the reference signals in the reference signal set, and reports information of new candidate beams to the network in a beam recovery message, that is, reports information of candidate beams selected by the terminal and having a communication quality satisfying a preset quality requirement (third reference signals having a signal quality meeting a preset quality requirement). Definitions for the preset quality requirement may be made in many ways, such as a RSRP exceeds a threshold or a BLER of a PDCCH corresponding to the third reference signal is lower than a certain threshold. Optionally, the beam failure recovery message contains only one new candidate beam (an identifier of a third reference signal). In this way, if quality of a plurality of beams is found to meet a performance quality requirement in a process of the measurement, the terminal may select one of the plurality of beams to report the same to the base station according to judgment by the terminal per se, for example, the strongest beam (i.e., a third reference signal having the best signal quality) is reported as the new candidate beam. Optionally, the third reference signals are reference signals determined according to a predefined manner. For example, the third reference signals are reference signals characterizing transmission beams corresponding to CORESETs where candidate PDCCHs carrying a beam failure response are located.

That is, on the premise that the PHY layer reports the result of beam failure monitoring to the MAC layer in respect of the BFD-RS, the MAC layer may count beam failure events for the BFD-RS, and when the number of beam failure events to which each of a preset number of BFD-RSs for one SCell is subjected reaches a certain threshold, the MAC layer determines that the SCell is subjected to beam failure, and the terminal reports to the base station that the SCell is subjected to beam failure or sends to the base station a beam failure recovery message for the SCell; or when the terminal further detects that the signal quality of at least one reference signal for beam failure recovery meets a preset quality requirement, the terminal reports to the base station that the SCell is subjected to beam failure or sends to the base station the beam failure recovery message for the SCell.

In summary, when the PHY layer reports the result of beam failure monitoring to the MAC layer for the BFD-RS, the terminal may report the beam failure for the BFD-RS to the base station and/or send a beam failure recovery message for the BFD-RS to the base station, or the terminal may report beam failure for the SCell to the base station and/or report a beam failure recovery message for the SCell to the base station.

In the manner in which the terminal reports the beam failure for the BFD-RS and/or sends the beam failure recovery message for the BFD-RS to the base station, the base station can flexibly and rapidly reconfigure the BFD-RS. For example, if the terminal reports that one BFD-RS is subjected to beam failure, the base station may delete the BFD-RS from a BFD-RS list, and may add a new BFD-RS. In the manner in which the terminal reports the beam failure to the base station in respect of a SCell and/or reports a beam failure recovery message in respect of a SCell to the base station, the base station may perform a fast and reliable beam failure recovery procedure for each SCell.

In addition, a beam failure recovery procedure may be initiated through sending a beam failure recovery message by initializing a RACH procedure (or other procedures). Optionally, a beam failure recovery (i.e., a new candidate beam) may correspond to a SCell corresponding to the BFD-RS before the BFD-RS is subjected to the beam failure, or the new candidate beam may correspond to a SCell different from that corresponding to an original BFD-RS.

Optionally, monitoring the beam failure event according to a reference signal for monitoring a beam failure of a secondary serving cell includes: when the physical layer of the terminal detects that the number of reference signals, having a signal quality is lower than a preset quality requirement, for monitoring beam failure of a first secondary serving cell reaches a preset number, reporting, to the medium access control layer, a monitoring result that the first secondary serving cell is subjected to a beam failure event, wherein the preset number is smaller than or equal to the total number of reference signals for monitoring the beam failure of the first secondary serving cell.

That is, if the PHY layer detects that a signal quality of each of a preset number of BFD-RSs in BFD-RSs of a SCell is lower than a preset quality requirement, the PHY layer reports to the MAC that the SCell is subjected to one beam failure event. In this manner, the PHY layer may report a beam failure event for each SCell separately. When one SCell corresponds to a plurality of beams, the PHY needs to store a monitoring result of previous beam failure, and the PHY cannot report the beam failure event to the MAC layer until all beams of the SCell are monitored.

Some possible ways of determining that a signal quality of a reference signal is lower than a preset quality requirement include: a RSRP estimated according to the reference signal is lower than a predetermined threshold; or a BLER of the PDCCH estimated according to the reference signal is higher than a preset threshold, etc.

Optionally, monitoring a beam failure event according to a reference signal for monitoring a beam failure of the secondary serving cell includes: when a physical layer of the terminal detects that a signal quality of a second reference signal is lower than a preset quality requirement, reporting, to a media access control layer, a monitoring result that a secondary service cell corresponding to the second reference signal is subjected to one beam failure event; wherein the second reference signal is one or more of reference signals for monitoring beam failure of the secondary serving cell. Optionally, the second reference signal is any one of one or more of the reference signals for monitoring the beam failure of the secondary serving cell.

It should be noted that the secondary serving cell corresponding to the second reference signal is a secondary serving cell for performing beam failure detection using the second reference signal. Unless otherwise specified, a serving cell Y corresponding to a reference signal X in the present disclosure means the serving cell Y performing beam failure monitoring using the reference signal X.

That is, if the PHY layer detects that a signal quality of one BFD-RS is lower than a preset quality requirement, the PHY layer reports one beam failure event to the MAC to indicate that each of all SCells corresponding to the BFD-RS is subjected to one beam failure event. In this manner, when one Cell corresponds to one BFD-RS and different Cells may correspond to the same BFD-RS, the PHY layer may report beam failure events for multiple SCells simultaneously in a reporting.

Some possible ways of judging that the signal quality of the reference signal is lower than the preset quality requirement are as follows: a RSRP estimated according to the reference signal is lower than a predetermined threshold; or a BLER of the PDCCH estimated according to the reference signal is higher than a preset threshold, etc.

It may be known from the above that the PHY layer of the terminal monitors the beam failure event, and then reports the result of beam failure monitoring to the MAC layer, and when the PHY layer reports the result of beam failure monitoring to the MAC layer, the PHY layer may also report in respect of the SCell.

Correspondingly, reporting the beam failure event to the base station and/or sending the beam failure recovery message to the base station include: reporting the beam failure event to the base station and/or sending the beam failure recovery message to the base station, according to the result of the monitoring reported by the physical layer to the medium access control layer.

Further, reporting the beam failure event to the base station and/or sending the beam failure recovery message to the base station according to the result of monitoring reported by the physical layer to the medium access control layer includes: if the number of beam failure events, detected by the media access control layer of the terminal, to which the first secondary serving cell is continuously subjected reaches a fifth preset number of times, reporting, by the terminal to the base station, that the first secondary serving cell is subjected to the beam failure and/or sending, by the terminal to the base station, a beam failure recovery message for the first secondary serving cell; or if the number of beam failure events, detected by the media access control layer of the terminal, to which the first secondary serving cell is continuously subjected reaches a fifth preset number of times, and the terminal monitors that a signal quality of at least one third reference signal meets a preset quality requirement, then reporting, by the terminal to the base station, that the first secondary serving cell is subjected to the beam failure and/or sending, by the terminal to the base station, a beam failure recovery message for the first secondary serving cell, wherein, the third reference signal is a reference signal for performing beam failure recovery.

Optionally, the third reference signal is configured by the base station through a signaling, for example, the base station configures a reference signal resource set for the terminal, and reference signals correspond to a candidate beam set. The reference signals are third reference signals. The terminal measures the reference signals in the reference signal set, and reports information of new candidate beams to the network in a beam recovery message, that is, reports information of candidate beams selected by the terminal and having a communication quality satisfying a preset quality requirement (third reference signals having a signal quality meeting a preset quality requirement). Definitions for the preset quality requirement may be made in many ways, such as a RSRP exceeds a threshold or a BLER of a PDCCH corresponding to the third reference signal is lower than a certain threshold. Optionally, the beam failure recovery message contains only one new candidate beam (an identifier of a third reference signal). In this way, if quality of a plurality of beams is found to meet a performance quality requirement in a process of the measurement, the terminal may select one of the plurality of beams to report the same to the base station according to judgment by the terminal per se, for example, the strongest beam (i.e., a third reference signal having the best signal quality) is reported as the new candidate beam. Optionally, the third reference signals are reference signals determined according to a predefined manner. For example, the third reference signals are reference signals characterizing transmission beams corresponding to CORESETs where candidate PDCCHs carrying a beam failure response are located.

That is, on the premise that the PHY layer reports the result of beam failure monitoring to the MAC layer in respect of SCell, the MAC layer may count beam failure events for the SCell, and when the number of beam failure events, continuously reported by the PHY layer to the MAC layer, to which one SCell is subjected reaches a certain threshold, the MAC layer determines that the SCell is subjected to beam failure, and the terminal reports to the base station that the SCell is subjected to beam failure or sends to the base station a beam failure recovery message for the SCell; or when the terminal further detects that the signal quality of at least one reference signal for beam failure recovery meets a preset quality requirement, the terminal reports to the base station that the SCell is subjected to beam failure or sends to the base station the beam failure recovery message for the SCell.

In summary, when the PHY layer reports the result of beam failure monitoring for the SCell to the MAC layer, the terminal may report only the beam failure for the SCell to the base station and/or send a beam failure recovery message for the SCell to the base station.

One of essential characteristics of radio mobile communication is that radio channels between the transmitting end and the receiving end have characteristics of rapid fluctuation. Hence, it is also possible that a beam quality continue to jump around a threshold. In order to avoid a ping-pong effect and frequently occurred beam failure events, in procedures that the PHY layer reports the monitoring result to the MAC layer, and the MAC layer reports the beam failure event to the base station and/or sends the beam failure recovery message to the base station, there is a process of counting beam failure events for BFD-RS or SCell. For example, when the PHY layer reports the result of beam failure monitoring to the MAC layer in respect of the BFD-RS, the PHY layer measures the signal quality of the BFD-RS in each transmission, and when the result of the measurement is lower than a threshold, one time of failure will be counted, and when the result of the measurement is higher than the threshold, one time of success will be counted. Only when the number of consecutive failure reaches a preset value, it is determined that the BFD-RS is subjected to beam failure.

In addition, it should be noted that: since the base station can transmit PDCCHs through a plurality of downlink control channel beams, a downlink beam failure is defined as that a quality of each downlink control channel beam received by the terminal is lower than a prescribed threshold, as a result of which control information transmitted by a PDCCH channel cannot be efficiently received by the terminal.

Without loss of generality, it is assumed that the base station has M beams for downlink control channel transmission, and a dedicated reference signal is configured for each beam, the terminal determines whether a downlink control channel satisfies a reception quality requirement by measuring the reference signals of the M beams. If a channel quality of each of the M beams is below the threshold, the terminal will consider a beam failure event occurs.

A monitoring indicator parameter of beam failure in an NR system is Block Error Rate (BLER), and a specific process is as follows: the terminal measures performance of a reference signal, of a beam the same as that of a downlink control channel, for beam failure monitoring, and a decoding error probability BLER of a PDCCH channel is deduced according to a measured signal quality of the reference signal (such as signal to interference and noise ratio, RSRP, RSRQ, etc.). If a value of the BLER is high than a configured threshold (e.g., BLER=10%), then the beam is considered to encounter failure. When the terminal measures that BLER values of all M beams are above the threshold, a beam failure event is considered to occur. In the process of measuring the BLER, it is not necessary to demodulate and decode the PDCCH channel, but to measure the performance of a corresponding reference signal, and to deduce the BLER of the PDCCH channel according to the result of the reference signal. Since a goal of beam failure measurement is to know whether a downlink control channel can be correctly received by the terminal, the BLER value can achieve this goal adequately.

Second Embodiment

Figure 2:
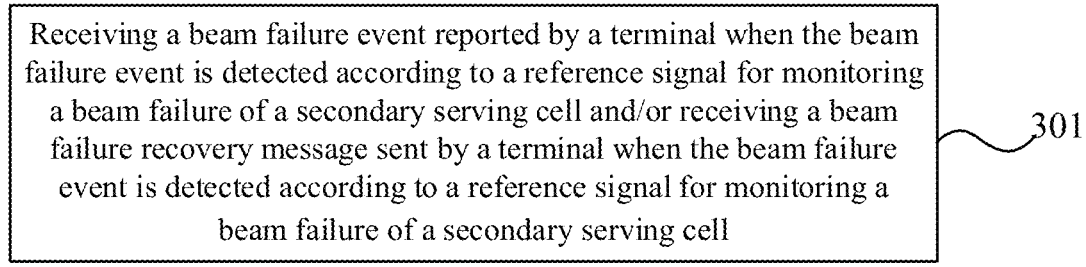
FIG. 2 shows a flowchart of a beam failure recovery method of a second embodiment of the present disclosure.

As shown in FIG. 2, the embodiment of the present disclosure provides a beam failure recovery method. Specifically, the method includes the following Step 301.

Step 301: receiving a beam failure event reported by a terminal and/or receiving a beam failure recovery message transmitted by a terminal, when the beam failure event is detected according to a reference signal for monitoring a beam failure of a secondary serving cell.

The beam failure recovery message includes at least a beam failure recovery request, a new candidate beam, and a beam quality monitored by the terminal. Optionally, the beam quality is a signal quality of the reference signal.

The beam failure event in a secondary serving cell may be monitored by monitoring a plurality of beams, one beam may be characterized by a reference signal for monitoring the beam failure of the secondary serving cell, and one secondary serving cell corresponds to a plurality of reference signals for monitoring the beam failure of the secondary serving cell.

Optionally, one of the reference signals may be simultaneously used for beam-failure-monitoring for at least two different serving cells.

If a reference signal can be used for beam failure monitoring for a secondary serving cell, it can be considered that the reference signal is associated with the secondary serving cell, that is, there is association relationship between the reference signal and the secondary serving cell in aspect of beam failure monitoring.

That is, one reference signal may also be used for beam-failure-monitoring for at least two different serving cells, i.e., one reference signal may be associated with one or more serving cells. Specifically, for example, one reference signal may be used for beam failure monitoring for two different secondary serving cells, or one reference signal may be used for beam failure monitoring for a primary serving cell and one secondary serving cell.

When a reference signal is used for monitoring beam failure of different serving cells, the terminal can determine the quality of a beam, corresponding to a certain direction, of a plurality of serving cells by monitoring a reference signal. Thus, an overhead of the reference signal and monitoring times of the terminal can be reduced.

For convenience of description, a reference signal for monitoring a beam failure of a serving cell may be defined as a Beam Failure Detection-Reference Signal (BFD-RS). A type of the BFD-RS may be a Synchronization Signal Block (SSB) or a Channel State Information Reference Signal (CSI-RS).

Optionally, the reference signal includes a reference signal, pre-configured by the base station, for monitoring a beam failure of the secondary serving cell and/or a pre-defined reference signal for monitoring a beam failure of the secondary serving cell.

In particular, the predefined reference signal for monitoring the beam failure of a target secondary serving cell includes a reference signal carried in transmission beam indication information for all control resource sets (CORESET) of a Physical Downlink Control Channel (PDCCH) monitored by the terminal in the target secondary serving cell; and/or a reference signal, in a preset frequency band, for monitoring the beam failure of the secondary serving cell, wherein the preset frequency band is the same as the frequency band of the target secondary serving cell.

As can be seen from the above, the BFD-RS may be configured to the terminal through a signaling by the base station (that is, explicit indication), or may be predefined (that is, configured to the terminal through implicit indication by the base station), or may be indicated to the terminal through a combination of explicit indication and implicit indication.

Specifically, the following manners may be adopted for configuration of the BFD-RS.

First Manner: Explicit Indication

The base station configures the BFD-RS to the terminal through a signaling. In addition to a reference signal ID in configuration parameters of the configuration, the configuration parameters may also include a reference signal type (e.g., SSB or CSI-RS) and/or a transmission power and/or a resource indication of a reference signal and/or a reference signal resource.

In such a configuration, each BFD-RS may be associated with one SCell or multiple SCells. In particular, the base station may configure, for each BFD-RS, an identity (ID) of the SCell associated with the BFD-RS.

In addition, in this configuration manner, if the base station configures the BFD-RS for the terminal through a signaling, the terminal determines the BFD-RS corresponding to each SCell according to association relationship between BFD-RSs and SCells. This means that if a BFD-RS associated with a certain SCell does not exist in the BFD-RSs configured by the base station, then the SCell does not have a corresponding BFD-RS.

Second Manner: Implicit Indication

One BFD-RS associated with all SCells within a frequency band in which the BFD-RS is located is predefined, or a BFD-RS set for one SCell may predefined to be derived from the transmission beam indication information (e.g., Transmission Configuration Indication (TCI) state) of a CORESET resource corresponding to the SCell.

The transmission beam indication information of the CORESET resource includes reference signal configuration information. For example, for a CORESET involving analog beamforming transmission, the TCI state will include configuration information of a reference signal with a Quasi-co-location (QCL) type, QCL-TypeD. If the base station does not explicitly configure the BFD-RS for one SCell, then the terminal may measure the reference signal, with the QCL (Quasi co-location) type being the QCL-TypeD in the TCI state configured for the CORESET of the SCell, to determine whether a beam failure occurs. That is, the reference signal (for example, the reference signal with the QCL type being the QCL-TypeD in the TCI state) indicated in the transmission beam indication information of the CORESET resource is the BFD-RS implicitly indicated. Optionally, the implicitly indicated BFD-RS contains only a specific type of reference signal, such as a periodic NZP CSI-RS (Non-Zero Power Channel State Information Reference Signal) among the above reference signals.

In addition, in this configuration, each BFD-RS may optionally be associated with a plurality of SCells. For example, parameter configuration information of a BFD-RS may include an indication signaling for an associated SCell or an associated SCell beam failure event, or association relationship between a reference signal and a SCell is included in the TCI state.

In addition, in this configuration manner, if the base station does not explicitly indicate a BFD-RS for the terminal through a signaling, then the terminal determines the BFD-RS of each SCell through the transmission beam indication information of the CORESET resource corresponding to the SCell. For example, a BFD-RS set of a SCell is a set of reference signals with the QCL (Quasi co-location) type being the QCL-TypeD in the TCI state of the CORESET corresponding to the SCell.

Third Manner: Combination of Explicit Indication and Implicit Indication

The base station may configure a group of BFD-RSs for the terminal through a signaling, and indicate the association relationship between the BFD-RSs and the SCells to the terminal. If a SCell has a BFD-RS associated with the SCell, then the terminal considers that a set of BFD-RSs corresponding to the SCell is a group consisting of all BFD-RSs associated with the SCell; if a SCell does not have a BFD-RS associated with the SCell, then the terminal considers that the BFD-RS set of the SCell is a group consisting of reference signals with the QCL type being the QCL-TypeD in the TCI state of the CORESET corresponding to the SCell. In this configuration manner, the base station can flexibly configure, for a serving cell, a reference signal for monitoring a beam failure event.

Fourth Manner: Combination of Explicit Indication and Implicit Indication

The BFD-RS set of one SCell is the sum of BFD-RSs associated with the SCell in the BFD-RSs configured by the base station for the terminal through a signaling and reference signals with the QCL type being the QCL-TypeD in the TCI state of the CORESET corresponding to the SCell. In this configuration manner, beams in which whether a beam failure occurs is monitored include candidate beams that can be used by a current PDCCH, and the base station may further configure the terminal to monitor more beam directions.

In addition, in this configuration manner, the base station can more flexibly change a transmission beam corresponding to the CORESET, for example, the base station can indicate, to a terminal through a dynamic signaling, that a transmission beam corresponding to a CORESET is a transmission beam of a BFD-RS configured by the base station. In this manner, even if a beam corresponding to a TCI state of a CORESET fails, the base station can still transmit the PDCCH using a transmission beam corresponding to the BFD-RS not subjected to the beam failure.

In addition, when the base station configures the BFD-RS for the terminal, the configuration may be specifically performed in the following manners.

First manner: optionally, before receiving the beam failure event reported by the terminal and/or receiving the beam failure recovery message transmitted by the terminal, when the beam failure event is detected according to the reference signal for monitoring the beam failure of the secondary serving cell, the method further includes: determining correspondence relationship between different serving cells and reference signals for monitoring the beam failure of the serving cells; and transmitting the correspondence relationship to the terminal.

Correspondence relationship between a serving cell and a reference signal means that the reference signal is used for monitoring the beam failure of the serving cell.

Further, the base station may also send, to the terminal, parameter information of a reference signal for monitoring a beam failure of a serving cell.

It should be noted that one case is that the serving cells herein include the primary serving cell and the secondary serving cell, and the other case is that the serving cells herein only include the secondary serving cells.

That is, the base station directly sends the correspondence relationship between different Cells and the BFD-RSs to the terminal, so that the terminal can determine the reference signal for monitoring the beam failure of each Cell according to the correspondence relationship when the terminal receives the correspondence relationship. Specific parameter information of all the BFD-RSs can also be sent to the terminal together with the above correspondence relationship.

Second manner: optionally, before receiving the beam failure event reported by the terminal and/or receiving the beam failure recovery message transmitted by the terminal, when the beam failure event is detected according to the reference signal for monitoring the beam failure of the secondary serving cell, the method further includes: obtaining parameter information of a reference signal for monitoring a beam failure of a serving cell; and sending, to the terminal, parameter information of reference signals respectively configured for different serving cells.

It should be noted that one case is that the serving cells herein include the primary serving cell and the secondary serving cell, and the other case is that the serving cells herein only include the secondary serving cells.

That is, the base station directly configures the parameter information of corresponding BFD-RSs for different cells, so that the terminal can directly monitor the beam failure event according to the parameter information of BFD-RSs configured for different cells by the base station.

Difference between the first manner and the second manner is that, in the first manner, correspondence relationship between different cells and BFD-RS is established, and the base station determines, based on configuration of a reference signal, a Cell which uses the reference signal for beam failure monitoring. This cell can be either a SCell or a PCell, or may be a Cell or be multiple Cells; whereas in the second manner, the parameter information of the BFD-RSs corresponding to different Cells is directly sent to the terminal, and the terminal can obtain the BFD-RS of the Cell for the configuration of the Cell.

Optionally, the beam failure event indicates that a second reference signal is subjected to a beam failure, and/or a beam failure recovery message is a beam failure recovery message for a second reference signal; the second reference signal is one or more of reference signals for monitoring beam failure of a secondary serving cell. Optionally, the second reference signal is any one of one or more of the reference signals for monitoring the beam failure of the secondary serving cell.

After receiving the beam failure event reported by the terminal and/or receiving the beam failure recovery message transmitted by the terminal, when the beam failure event is detected according to the reference signal for monitoring the beam failure of the secondary serving cell, the method further includes: sending a beam failure recovery response for the second reference signal to the terminal.

That is, when the terminal reports the beam failure event for one BFD-RS and/or transmits a beam failure recovery message for one BFD-RS, the base station may return a beam failure recovery response for the BFD-RS.

Further, sending the beam failure recovery response for the second reference signal to the terminal includes: sending, to the terminal, reconfiguration information of a reference signal for monitoring the beam failure of the secondary serving cell corresponding to the second reference signal.

That is, if the terminal receives the reconfiguration information of the reference signal for monitoring the beam failure of the secondary service cell corresponding to the second reference signal, the terminal may confirm reception of the beam failure recovery response.

Optionally, the beam failure event indicates that a first secondary serving cell is subjected to beam failure, and/or the beam failure recovery message is a beam failure recovery message for the first secondary serving cell. After receiving the beam failure event reported by the terminal and/or receiving the beam failure recovery message transmitted by the terminal, when the beam failure event is detected according to the reference signal for monitoring the beam failure of the secondary serving cell, the method further includes: sending a beam failure recovery response for the first secondary serving cell to the terminal.

That is, when the terminal reports a beam failure event for a SCell and/or transmits a beam failure recovery message for a SCell, the base station may return a beam failure recovery response for the SCell.

Further, sending the beam failure recovery response for the first secondary serving cell to the terminal includes:

sending, to the terminal, reconfiguration information of the reference signal for monitoring the beam failure of the first secondary serving cell.

That is, if the terminal receives the reconfiguration information of the reference signal for monitoring the beam failure of the first secondary service cell, the terminal can confirm reception of the beam failure recovery response.

Among them, it should be noted that: when the terminal obtains the beam failure event through measurement and reports the event to the base station, the terminal also needs to report new candidate beam information. After the base station receives the reported information, the base station recovers from the beam failure as soon as possible through a beam recovery procedure, and reselects a new beam for transmission to replace a previous beam. The new beam will be used for transmission of response information to the reported failure events by the base station, and subsequent transmission of data and control information between the base station and the terminal.

In order to enable the terminal to report the new candidate beam, the network needs to configure a corresponding reference signal resource set for the terminal, and reference signals correspond to a candidate beam set. The terminal determines a transmission-reception beam pair for a transmission link by measuring a set of reference signals. After completing the measurement, the terminal reports the new candidate beam to a network, and the selected new candidate beam needs to meet a performance quality requirement that a Reference Signal Receiving Power (RSRP) exceeds a threshold. In a standard document, the terminal only reports one new candidate beam to the base station. If quality of a plurality of beams is found to meet a threshold requirement in a process of the measurement, the terminal may select one of the plurality of beams to report the same to the base station according to judgment by the terminal per se, for example, the strongest beam is reported.

In beam failure measurement and recovery procedures, a channel for beam failure recovery is a physical random access (PRACH) channel in order not to affect a conventional random access process. The PRACH channel is an uplink synchronization and information exchange channel used by the terminal for initial access to the network. By sending an uplink preamble sequence through the PRACH channel, the network can realize such functions as acknowledgement to the terminal, measurement of uplink synchronization, and contention resolution. In 5G NR, a system support a plurality of PRACH channels, each PRACH channel corresponds to one SSB (different SSBs perform broadcast information transmission with beams of different transmission directions), the PRACH channel selected by the terminal corresponds to the most suitable downlink SSB beam transmission direction. Therefore, when a one-to-one correspondence is established between a reference signal corresponding to a candidate downlink beam and an uplink PRACH channel, it means that the base station obtains, through a detected PRACH channel, the candidate beam information reported by the terminal. The PRACH channel may employ a contention-based PHY layer channel or a non-contention-based dedicated PHY layer channel. The terminal will be allocated with a dedicated random access channel resource and a random access preamble sequence, each random access channel and each preamble sequence correspond to a beam direction of a SSB transmission block. Once a downlink beam failure event occurs and a new candidate beam is selected, transmission will be performed through a random access channel and a preamble sequence corresponding to the candidate beam.

Another mechanism that can be used for beam failure recovery is to report candidate beams using PUCCH. It can be understood that the reporting of the candidate beams does not exclude other method. In a 5G NR standard, the PUCCH channel is used for transmitting uplink control signaling, and the PUCCH channel reports various types of uplink control signalings to the network, the types of uplink control signaling includes an Acknowledgement/Negative ACKnowledgement (ACK/NACK), a scheduling request, Channel State Information (CSI) and beam measurement results, etc. One terminal may configure multiple PUCCH channel resources, and different PUCCH channel resources correspond to different physical resources, transmission powers, load capability and load types. The PUCCH channel transmission beam is configured by the network. Compared with the PRACH channel, the PUCCH channel has better reporting capability and flexibility, and more information such as multiple candidate beams and beam quality can be reported to the network through the PUCCH channel.

In addition, each terminal is assigned a plurality of CORESETs for transmission of PDCCH, each CORESET is configured with one beam transmission direction. The beams corresponding to these original CORESETs will not be changed during the beam recovery procedure. The network will configure for the terminal a dedicated CORESET, called CORESET_BFR, for transmission of a control signaling for beam recovery. After the terminal measures and reports the beam failure message, the terminal starts to monitor the PDCCH channel of the CORESET_BFR, and it is assumed that a used beam is a reported new candidate beam. Corresponding to a reporting process by the terminal, the base station will transmit the PDCCH channel in the CORESET_BFR with the new beam. When the terminal detects the PDCCH channel, the terminal will consider that the reported beam failure event and the new candidate beam are correctly received by the base station. When the terminal detects the PDCCH channel, the terminal will consider that the reported beam failure event and the new candidate beam are correctly received by the base station, the beam failure has been recovered, and then the terminal terminates the beam failure recovery procedure.

If the terminal does not receive an RRC reconfiguration message (used for beam configuration of an original CORESET set) after the base station receives the reporting of the beam failure event and sends a response message in the CORESET_BFR, then the CORESET_BFR will be used as another CORESET for scheduling to perform normal communication; if the terminal receives the RRC reconfiguration message, the terminal will obtain a new beam configuration of a CORESET set according to the information, and stop monitoring the CORESET_BFR.

In the beam recovery procedure, the original CORESET still adopts the originally configured beam, and the terminal also monitors the PDCCH channel in the original beam direction. Although the terminal has reported to the base station that all control channels are in a beam failure state, this judgment is based on a BLER measurement result of 10%, the terminal may still receive a control signaling message in the original PDCCH channel. Therefore, when the base station receives the reporting of the beam failure and sends a response message in the CORESET_BFR, the base station and the terminal can continue to communicate using the originally configured CORESET set and beam parameters, and beams of a downlink control channel can be reconfigured.

Third Embodiment

Figure 3:
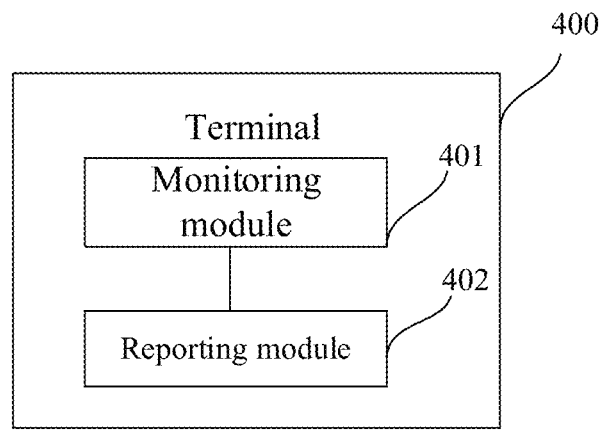
FIG. 3 shows a block diagram of a terminal according to a third embodiment of the present disclosure.

As shown in FIG. 3, the embodiment of the present disclosure provides a terminal. The terminal 400 includes a monitoring module 401 and a reporting module 402.

The monitoring module 401 is configured for monitoring a beam failure event according to a reference signal for monitoring a beam failure of a secondary serving cell. The reporting module 402 is configured for, when a beam failure event is detected by the monitoring module, reporting the beam failure event to a base station and/or transmitting a beam failure recovery message to the base station.

Optionally, one reference signal may be simultaneously used for beam-failure-monitoring for at least two different serving cells.

Optionally, the reference signal includes a reference signal, pre-configured by the base station, for monitoring a beam failure of the secondary serving cell and/or a pre-defined reference signal for monitoring a beam failure of the secondary serving cell.

Optionally, the monitoring module 401 is specifically configured for, when monitoring the beam failure event according to the reference signal for monitoring the beam failure of the secondary serving cell: when a PHY layer of the terminal detects that a signal quality of a second reference signal is lower than a preset quality requirement, controlling the PHY layer to report, to a MAC layer, a monitoring result that the second reference signal is subjected to a beam failure event; wherein the second reference signal is one or more of reference signals for monitoring the beam failure of the secondary serving cell.

Optionally, the monitoring module 401 is specifically configured for, when monitoring the beam failure event according to the reference signal for monitoring the beam failure of the secondary serving cell: when the PHY layer of the terminal detects that the number of fourth reference signals having a signal quality lower than a preset quality requirement reaches a preset number, controlling the PHY layer to report, to the MAC layer, a monitoring result that a first secondary serving cell is subjected to a beam failure event, wherein the fourth reference signal is a reference signal for monitoring the beam failure of the first secondary serving cell; the preset number is less than or equal to the total number of reference signals for monitoring the beam failure of the first secondary serving cell.

Some possible ways of determining that a signal quality of a reference signal is lower than a preset quality requirement include: a RSRP estimated according to the reference signal is lower than a predetermined threshold; or a BLER of the PDCCH estimated according to the reference signal is higher than a preset threshold, etc.

Optionally, when monitoring the beam failure event according to the reference signal for monitoring the beam failure of the secondary serving cell, the monitoring module 401 is specifically configured for, when the PHY layer of the terminal detects that the signal quality of the second reference signal is lower than a preset quality requirement, controlling the PHY layer to report, to the MAC layer, a monitoring result that a secondary serving cell corresponding to the second reference signal is subjected to a beam failure event; wherein, the second reference signal is one or more of the reference signals for monitoring the beam failure of the secondary serving cell.

Some possible ways of determining that the signal quality of the reference signal is lower than the preset quality requirement are as follows: a RSRP estimated according to the reference signal is lower than a predetermined threshold; or a BLER of the PDCCH estimated according to the reference signal is higher than a preset threshold, etc.

Optionally, the reporting module 402 includes a first reporting unit. The first reporting unit is configured for reporting, to the base station, a beam failure event and/or sending, to the base station, a beam failure recovery message, according to a monitoring result reported by the PHY layer to the MAC layer.

Optionally, the first reporting unit is specifically configured for, when the MAC layer of the terminal detects that the number of beam failure events to which the second reference signal is continuously subjected reaches a first preset number of times, reporting, to the base station, that the second reference signal is subjected to beam failure and/or sending, to the base station, a beam failure recovery message for the second reference signal; or if the media access control layer of the terminal detects that the number of beam failure events to which the second reference signal is continuously subjected reaches the first preset number of times, and the terminal detects that the signal quality of at least one third reference signal satisfies a preset quality requirement, then reporting, by the terminal to the base station, that the second reference signal is subjected to the beam failure and/or sending, by the terminal to the base station, a beam failure recovery message for the second reference signal; or if the media access control layer of the terminal detects that the number of beam failure events to which the second reference signal is continuously subjected reaches a second preset number of times, then reporting, to the base station, that a secondary serving cell corresponding to the second reference signal is subjected to the beam failure and/or sending, to the base station, a beam failure recovery message for the secondary serving cell corresponding to the second reference signal; or, if the media access control layer of the terminal detects that the number of beam failure events to which the second reference signal is continuously subjected reaches a second preset number of times, and the terminal detects that the signal quality of at least one third reference signal meets a preset quality requirement, then, reporting, to the base station, that a secondary serving cell corresponding to the second reference signal is subjected to beam failure or sending to the base station a beam failure recovery message for the secondary serving cell corresponding to the second reference signal; or controlling the media access control layer of the terminal to determine, according to the monitoring result that the second reference signal is subjected to a beam failure event, whether the first secondary serving cell is subjected to the beam failure event; if the MAC layer of the terminal detects that the number of beam failure events to which the first secondary serving cell is continuously subjected reaches a third preset number of times, reporting, to the base station, that the first secondary serving cell is subjected to beam failure and/or sending, to the base station, a beam failure recovery message for the first secondary serving cell, or if the media access control layer of the terminal detects that the number of beam failure events to which the first secondary serving cell is continuously subjected reaches a third preset number of times, and the terminal detects that the signal quality of at least one third reference signal satisfies a preset quality requirement, then reporting, to the base station, that the first secondary serving cell is subjected to beam failure and/or sending, to the base station, a beam failure recovery message for the first secondary serving cell; or if the MAC layer of the terminal detects that the number of beam failure events to which each of a predefined number of fourth reference signals is continuously subjected reaches a fourth preset number of times, then, reporting, to the base station, that the first secondary serving cell is subjected to beam failure and/or sending, to the base station, a beam failure recovery message for the first secondary serving cell; or if the media access control layer of the terminal detects that the number of beam failure events to which each of a preset number of fourth reference signals is continuously subjected reaches a fourth preset number of times, and the terminal detects that the signal quality of at least one third reference signal meets a preset quality requirement, then reporting, to the base station, that the first secondary serving cell is subjected to beam failure and/or sending, to the base station, a beam failure recovery message for the first secondary serving cell, wherein the fourth reference signals are reference signals for monitoring the beam failure of the first secondary serving cell; wherein, the preset number is less than or equal to the total number of reference signals for monitoring the beam failure of the first secondary serving cell, and the third reference signal is a reference signal for performing beam failure recovery.

Optionally, the reporting module 402 includes a second reporting unit. The second reporting unit is configured for reporting, to the base station, a beam failure event and/or sending, to the base station, a beam failure recovery message, according to the monitoring result reported by the PHY layer to the MAC layer.

Optionally, the second reporting unit is specifically configured for: if the number of beam failure events, detected by the MAC layer of the terminal, to which the first secondary serving cell is continuously subjected reaches a fifth preset number of times, reporting, to the base station, that the first secondary serving cell is subjected to the beam failure and/or sending, to the base station, a beam failure recovery message for the first secondary serving cell; or if the number of beam failure events, detected by the media access control layer of the terminal, to which the first secondary serving cell is continuously subjected reaches a fifth preset number of times, and the terminal monitors that a signal quality of at least one third reference signal meets a preset quality requirement, then reporting, to the base station, that the first secondary serving cell is subjected to the beam failure and/or sending, to the base station, a beam failure recovery message for the first secondary serving cell, wherein, the third reference signal is a reference signal for performing beam failure recovery.

Optionally, the third reference signal is configured by the base station through a signaling, for example, the base station configures a reference signal resource set for the terminal, and reference signals correspond to a candidate beam set. The reference signals are third reference signals. The terminal measures the reference signals in the reference signal set, and reports information of new candidate beams to the network in a beam recovery message, that is, reports information of candidate beams selected by the terminal and having a communication quality satisfying a preset quality requirement (third reference signals having a signal quality meeting a preset quality requirement). Definitions for the preset quality requirement may be made in many ways, such as a RSRP exceeds a threshold or a BLER of a PDCCH corresponding to the third reference signal is lower than a certain threshold. Optionally, the beam failure recovery message contains only one new candidate beam (an identifier of a third reference signal). In this way, if quality of a plurality of beams is found to meet a performance quality requirement in a process of the measurement, the terminal may select one of the plurality of beams to report the same to the base station according to judgment by the terminal per se, for example, the strongest beam (i.e., a third reference signal having the best signal quality) is reported as the new candidate beam. Optionally, the third reference signals are reference signals determined according to a predefined manner. For example, the third reference signals are reference signals characterizing transmission beams corresponding to CORESETs where candidate PDCCHs carrying a beam failure response are located.

Optionally, a predefined reference signal for monitoring the beam failure of a target secondary serving cell includes a reference signal carried in transmission beam indication information for all control resource sets (CORESET) of a Physical Downlink Control Channel (PDCCH) monitored by the terminal in the target secondary serving cell; and/or a reference signal, in a preset frequency band, for monitoring the beam failure of the secondary serving cell, wherein the preset frequency band is the same as the frequency band of the target secondary serving cell.

Optionally, the terminal further includes a second receiving module. The second receiving module is configured for receiving configuration information, sent by the base station, of the reference signal for monitoring the beam failure of the serving cell; wherein the configuration information includes correspondence relationship between different serving cells and reference signals for monitoring the beam failure of the serving cells.

Optionally, the configuration information further includes parameter information of the reference signal for monitoring the beam failure of the serving cell.

It should be noted that one case is that the serving cells herein include the primary serving cell and the secondary serving cell, and the other case is that the serving cells herein only include the secondary serving cells.

Optionally, the terminal further includes a third receiving module. The third receiving module is configured for receiving configuration information, sent by the base station, of the reference signal for monitoring the beam failure of a serving cell, wherein the configuration information includes parameter information of reference signals, corresponding to different serving cells, for monitoring the beam failure of the serving cells.

It should be noted that one case is that the serving cells herein include the primary serving cell and the secondary serving cell, and the other case is that the serving cells herein only include the secondary serving cells.

Fourth Embodiment

Figure 4:
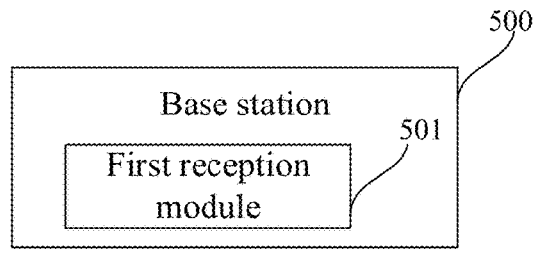
FIG. 4 shows a block diagram of a base station according to a fourth embodiment of the present disclosure.

As shown in FIG. 4, the embodiment of the present disclosure provides a base station. The base station 500 includes a first receiving module 501. The first reception module 501 is configured for receiving a beam failure event reported by a terminal and/or receiving a beam failure recovery message transmitted by a terminal, when the beam failure event is detected according to a reference signal for monitoring a beam failure of a secondary serving cell.

Optionally, one reference signal may be simultaneously used for beam-failure-monitoring for at least two different serving cells.

Optionally, the reference signal includes a reference signal, pre-configured by the base station, for monitoring a beam failure of the secondary serving cell and/or a predefined reference signal for monitoring a beam failure of the secondary serving cell.

Optionally, the beam failure event indicates that a second reference signal is subjected to a beam failure, and/or a beam failure recovery message is a beam failure recovery message for a second reference signal; the second reference signal is one or more of reference signals for monitoring the beam failure of a secondary serving cell.

The base station further includes a first sending module. The first sending module is configured for sending a beam failure recovery response for the second reference signal to the terminal.

Optionally, the first sending module is specifically configured for: sending, to the terminal, reconfiguration information of a reference signal for monitoring the beam failure of the secondary serving cell corresponding to the second reference signal.

Optionally, the beam failure event indicates that a first secondary serving cell is subjected to beam failure, and/or the beam failure recovery message is a beam failure recovery message for the first secondary serving cell.

The base station further includes a second sending module. The second sending module is configured for sending, to the terminal, reconfiguration information of the reference signal for monitoring the beam failure of the first secondary serving cell.

Optionally, a predefined reference signal for monitoring the beam failure of a target secondary serving cell includes a reference signal carried in transmission beam indication information for all control resource sets (CORESET) of a Physical Downlink Control Channel (PDCCH) monitored by the terminal in the target secondary serving cell; and/or a reference signal, in a preset frequency band, for monitoring the beam failure of the secondary serving cell, wherein the preset frequency band is the same as the frequency band of the target secondary serving cell.

Optionally, the base station further includes a relationship determination module and a configuration module; and/or, a parameter obtaining module and a third sending module.

The relationship determination module is configured for determining correspondence relationship between different serving cells and reference signals for monitoring the beam failure of the serving cells. The configuration module is configured for configuring the correspondence relationship to the terminal.

The parameter obtaining module is configured for obtaining parameter information of a reference signal for monitoring a beam failure of a serving cell. The third sending module is configured for sending, to the terminal, parameter information of reference signals respectively configured for different serving cells.

It should be noted that one case is that the serving cells herein include the primary serving cell and the secondary serving cell, and the other case is that the serving cells herein only include the secondary serving cells.

Fifth Embodiment

Figure 5:
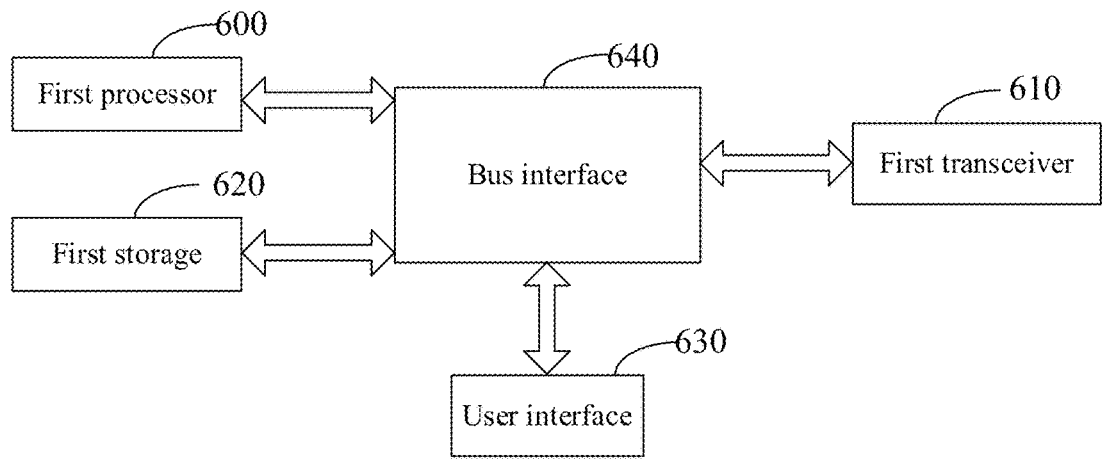
FIG. 5 is a block diagram of a structure of a terminal according to a fifth embodiment of the present disclosure.

In order to better achieve the above objective, as shown in FIG. 5, this embodiment provides a terminal. The terminal includes a first processor 600, and a first storage 620 coupled to the first processor 600 through a bus interface 640, the first storage 620 is configured for storing programs and data used when the first processor 600 executes operations. When the first processor 600 invokes and executes the programs and the data stored in the first storage 620, the first processor 600 executes following steps. The first transceiver 610 is connected to the bus interface 640 and is configured for receiving and transmitting data under the control of the second processor 700.

The first processor 600 is configured for monitoring a beam failure event according to a reference signal for monitoring a beam failure of a secondary serving cell; when a beam failure event is detected by the first processor, reporting the beam failure event to a base station and/or transmitting a beam failure recovery message to the base station.

Optionally, one reference signal may be simultaneously used for beam-failure-monitoring for at least two different serving cells.

Optionally, the reference signal includes a reference signal, pre-configured by the base station, for monitoring a beam failure of the secondary serving cell and/or a predefined reference signal for monitoring a beam failure of the secondary serving cell.

Optionally, when monitoring the beam failure event according to the reference signal for monitoring the beam failure of the secondary serving cell, the first processor is specifically configured for: when a physical layer of the terminal is controlled to detect that a signal quality of a second reference signal is lower than a preset quality requirement, controlling the physical layer to report, to a medium access control layer, a monitoring result that the second reference signal is subjected to a beam failure event; wherein the second reference signal is one or more of reference signals for monitoring the beam failure of the secondary serving cell.

Some possible ways of determining that a signal quality of a reference signal is lower than a preset quality requirement include: a RSRP estimated according to the reference signal is lower than a predetermined threshold; or a BLER of the PDCCH estimated according to the reference signal is higher than a preset threshold, etc.

Optionally, when monitoring the beam failure event according to the reference signal for monitoring the beam failure of the secondary serving cell, the first processor is specifically configured for: when the physical layer of the terminal is controlled to detect that the number of fourth reference signals having a signal quality lower than a preset quality requirement reaches a preset number, controlling the physical layer to report, to the media access control layer, a monitoring result that a first secondary serving cell is subjected to a beam failure event, wherein the fourth reference signal is a reference signal for monitoring the beam failure of the first secondary serving cell; the preset number is less than or equal to the total number of reference signals for monitoring the beam failure of the first secondary serving cell.

Some possible ways of determining that a signal quality of a reference signal is lower than a preset quality requirement include: a RSRP estimated according to the reference signal is lower than a predetermined threshold; or a BLER of the PDCCH estimated according to the reference signal is higher than a preset threshold, etc.

Optionally, when monitoring the beam failure event according to the reference signal for monitoring the beam failure of the secondary serving cell, the first processor is specifically configured for: when the physical layer of the terminal is controlled to detect that the signal quality of the second reference signal is lower than a preset quality requirement, controlling the physical layer to report, to the media access control layer, a monitoring result that a secondary serving cell corresponding to the second reference signal is subjected to a beam failure event; wherein, the second reference signal is one or more of the reference signals for monitoring the beam failure of the secondary serving cell.

Some possible ways of determining that the signal quality of the reference signal is lower than the preset quality requirement are as follows: a RSRP estimated according to the reference signal is lower than a predetermined threshold; or a BLER of the PDCCH estimated according to the reference signal is higher than a preset threshold, etc.

Optionally, when reporting the beam failure event to the base station and/or transmitting a beam failure recovery message to the base station, the first processor is specifically configured for: reporting, to the base station, a beam failure event and/or sending, to the base station, a beam failure recovery message, according to a monitoring result reported by the physical layer to the media access control layer.

Optionally, when reporting, to the base station, a beam failure event and/or sending, to the base station, the beam failure recovery message, according to a monitoring result reported by the physical layer to the media access control layer, the first processor is specifically configured for: when the media access control layer of the terminal is controlled by the first processor to detect that the number of beam failure events to which the second reference signal is continuously subjected reaches a first preset number of times, reporting, by the first processor to the base station, that the second reference signal is subjected to beam failure and/or sending, by the first processor to the base station, a beam failure recovery message for the second reference signal; or if the media access control layer of the terminal is controlled by the first processor to detect that the number of beam failure events to which the second reference signal is continuously subjected reaches the first preset number of times, and the first processor detects that the signal quality of at least one third reference signal satisfies a preset quality requirement, then reporting, by the terminal to the base station, that the second reference signal is subjected to the beam failure and/or sending, by the terminal to the base station, a beam failure recovery message for the second reference signal; or if the media access control layer of the terminal is controlled by the first processor to detect that the number of beam failure events to which the second reference signal is continuously subjected reaches a second preset number of times, then reporting, by the first processor to the base station, that a secondary serving cell corresponding to the second reference signal is subjected to the beam failure and/or sending, by the first processor to the base station, a beam failure recovery message for the secondary serving cell corresponding to the second reference signal; or, if the media access control layer of the terminal is controlled by the first processor to detect that the number of beam failure events to which the second reference signal is continuously subjected reaches a second preset number of times, and the first processor detects that the signal quality of at least one third reference signal meets a preset quality requirement, then, reporting, by the first processor to the base station, that a secondary serving cell corresponding to the second reference signal is subjected to beam failure or sending to the base station a beam failure recovery message for the secondary serving cell corresponding to the second reference signal; or controlling, by the first processor, the media access control layer of the terminal to determine, according to the monitoring result that the second reference signal is subjected to a beam failure event, whether the first secondary serving cell is subjected to the beam failure event; if the media access control layer of the terminal is controlled by the first processor to detect that the number of beam failure events to which the first secondary serving cell is continuously subjected reaches a third preset number of times, reporting, by the first processor to the base station, that the first secondary serving cell is subjected to beam failure and/or sending, by the first processor to the base station, a beam failure recovery message for the first serving cell, or if the media access control layer of the terminal is controlled by the first processor to detect that the number of beam failure events to which the first secondary serving cell is continuously subjected reaches a third preset number of times, and the first processor detects that the signal quality of at least one third reference signal satisfies a preset quality requirement, then reporting, by the first processor to the base station, that the first secondary serving cell is subjected to beam failure and/or sending, by the first processor to the base station, a beam failure recovery message for the first secondary serving cell; or if the media access control layer of the terminal is controlled by the first processor to detect that the number of beam failure events to which each of a predefined number of fourth reference signals is continuously subjected reaches a fourth preset number of times, then, reporting, by the first processor to the base station, that the first secondary serving cell is subjected to beam failure and/or sending, by the first processor to the base station, a beam failure recovery message for the first secondary serving cell; or if the media access control layer of the terminal is controlled by the first processor to detect that the number of beam failure events to which each of a preset number of fourth reference signals is continuously subjected reaches a fourth preset number of times, and the first processor detects that the signal quality of at least one third reference signal meets a preset quality requirement, then reporting, by the first processor to the base station, that the first secondary serving cell is subjected to beam failure and/or sending, by the first processor to the base station, a beam failure recovery message for the first secondary serving cell, wherein the preset number is less than or equal to the total number of reference signals for monitoring the beam failure of the first secondary serving cell, the third reference signal is a reference signal for performing beam failure recovery, and the fourth reference signals are reference signals for monitoring the beam failure of the first secondary serving cell.

Optionally, when reporting the beam failure event to the base station and/or transmitting the beam failure recovery message to the base station, the first processor is specifically configured for: reporting the beam failure event to the base station and/or transmitting the beam failure recovery message to the base station, according to the monitoring result reported by the physical layer to the media access control layer.

Optionally, when reporting the beam failure event to the base station and/or transmitting the beam failure recovery message to the base station, according to the monitoring result reported by the physical layer to the media access control layer, the first processor is specifically configured for: if the media access control layer of the terminal is controlled by the first processor to detect that the number of beam failure events to which the first secondary serving cell is continuously subjected reaches a fifth preset number of times, reporting, by the first processor to the base station, that the first secondary serving cell is subjected to the beam failure and/or sending, by the first processor to the base station, a beam failure recovery message for the first secondary serving cell; or if the media access control layer of the terminal is controlled by the first processor to detect that the number of beam failure events to which the first secondary serving cell is continuously subjected reaches a fifth preset number of times, and the first processor monitors that a signal quality of at least one third reference signal meets a preset quality requirement, then reporting, by the first processor to the base station, that the first secondary serving cell is subjected to the beam failure and/or sending, by the first processor to the base station, a beam failure recovery message for the first secondary serving cell, wherein, the third reference signal is a reference signal for performing beam failure recovery.

Optionally, the third reference signal is configured by the base station through a signaling, for example, the base station configures a reference signal resource set for the terminal, and reference signals correspond to a candidate beam set. The reference signals are third reference signals. The terminal measures the reference signals in the reference signal set, and reports information of new candidate beams to the network in a beam recovery message, that is, reports information of candidate beams selected by the terminal and having a communication quality satisfying a preset quality requirement (third reference signals having a signal quality meeting a preset quality requirement). Definitions for the preset quality requirement may be made in many ways, such as a RSRP exceeds a threshold or a BLER of a PDCCH corresponding to the third reference signal is lower than a certain threshold. Optionally, the beam failure recovery message contains only one new candidate beam (an identifier of a third reference signal). In this way, if quality of a plurality of beams is found to meet a performance quality requirement in a process of the measurement, the terminal may select one of the plurality of beams to report the same to the base station according to judgment by the terminal per se, for example, the strongest beam (i.e., a third reference signal having the best signal quality) is reported as the new candidate beam. Optionally, the third reference signals are reference signals determined according to a predefined manner. For example, the third reference signals are reference signals characterizing transmission beams corresponding to CORESETs where candidate PDCCHs carrying a beam failure response are located.

Optionally, a predefined reference signal for monitoring the beam failure of a target secondary serving cell includes a reference signal carried in transmission beam indication information for all control resource sets (CORESET) of a Physical Downlink Control Channel (PDCCH) monitored by the terminal in the target secondary serving cell; and/or a reference signal, in a preset frequency band, for monitoring the beam failure of the secondary serving cell, wherein the preset frequency band is the same as the frequency band of the target secondary serving cell.

Optionally, the first processor is further configured for: receiving configuration information, sent by the base station, of the reference signal for monitoring the beam failure of the serving cell; wherein the configuration information includes correspondence relationship between different serving cells and reference signals for monitoring the beam failure of the serving cells.

Optionally, the configuration information further includes parameter information of the reference signal for monitoring the beam failure of the serving cell.

Optionally, the first processor is further configured for receiving configuration information, sent by the base station, of the reference signal for monitoring the beam failure of a serving cell, wherein the configuration information includes parameter information of reference signals, corresponding to different serving cells, for monitoring the beam failure of the serving cells.

It should be noted that in FIG. 5, a bus architecture may include any number of interconnected buses and bridges, and connects various circuits including one or more processors represented by the first processor 600 and a storage represented by the first storage 602. The bus architecture may also connect various other circuits such as peripherals, voltage regulators and power management circuits, which are well known in the art. Therefore, a detailed description thereof is omitted herein. A bus interface provides an interface. The first transceiver 610 may be multiple elements, such as a transmitter and a receiver, to allow for communication with various other apparatuses on the transmission medium. For different terminals, a user interface 630 may be an interface capable of externally or internally connecting a required device, and the connected device includes, but is not limited to: a keypad, a display, a speaker, a microphone, a joystick and the like. The first processor 600 is responsible for supervising the bus architecture and normal processing and the first storage 620 may store the data being used by the processor 600 during operation.

It is understood by those skilled in the art that all or a part of the steps of the aforementioned embodiments may be implemented through hardware, or through a program configured to instruct relevant hardware, wherein the program includes instructions configured to perform a part or all of the steps of the aforementioned method. The program may be stored in a readable storage medium, and the storage medium may be any form of storage medium.

Sixth Embodiment

Figure 6:
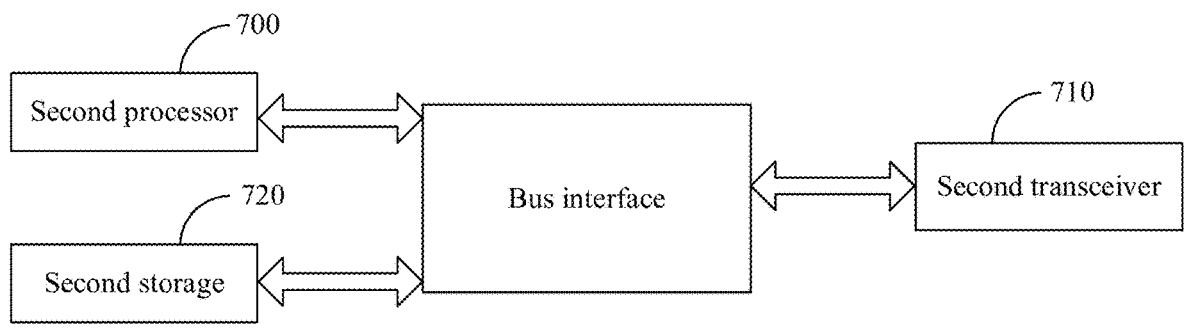
FIG. 6 is a block diagram of a structure of a base station according to a sixth embodiment of the present disclosure.

In order to better achieve the above objective, as shown in FIG. 6, this embodiment provides a base station. The base station includes a second processor 700, a second storage 720 coupled to the second processor 700 through a bus interface, and a second transceiver 710 connected to the second processor 700 through a bus interface. The second storage 720 is configured for storing programs and data used when the second processor 700 executes operations. Data information or pilots are transmitted through the second transceiver 710, and an uplink control channel is also received through the second transceiver 710. When the second processor 700 invokes and executes the programs and the data stored in the second storage 720, the second processor 700 executes a following step: receiving a beam failure event reported by a terminal and/or receiving a beam failure recovery message transmitted by a terminal, when a beam failure event is detected according to a reference signal for monitoring a beam failure of a secondary serving cell.

Optionally, one reference signal may be simultaneously used for beam-failure-monitoring for at least two different serving cells.

Optionally, the reference signal includes a reference signal, pre-configured by the base station, for monitoring a beam failure of the secondary serving cell and/or a predefined reference signal for monitoring a beam failure of the secondary serving cell.

Optionally, the beam failure event indicates that a second reference signal is subjected to a beam failure, and/or a beam failure recovery message is a beam failure recovery message for a second reference signal; the second reference signal is one or more of reference signals for monitoring the beam failure of a secondary serving cell.

The second processor 700 is further configured for sending a beam failure recovery response for the second reference signal to the terminal.

Optionally, when sending the beam failure recovery response for the second reference signal to the terminal, the second processor 700 is specifically configured for sending, to the terminal, reconfiguration information of a reference signal for monitoring the beam failure of the secondary serving cell corresponding to the second reference signal.

Optionally, the beam failure event indicates that a first secondary serving cell is subjected to beam failure, and/or the beam failure recovery message is a beam failure recovery message for the first secondary serving cell.

The second processor 700 is further configured for sending, to the terminal, a beam failure recovery response for the first secondary serving cell.

Optionally, when sending, to the terminal, the beam failure recovery response for the first secondary serving cell, the second processor is specifically configured for: sending, to the terminal, reconfiguration information of the reference signal for monitoring the beam failure of the first secondary serving cell.

Optionally, a predefined reference signal for monitoring the beam failure of a target secondary serving cell includes a reference signal carried in transmission beam indication information for all control resource sets (CORESET) of a Physical Downlink Control Channel (PDCCH) monitored by the terminal in the target secondary serving cell; and/or a reference signal, in a preset frequency band, for monitoring the beam failure of the secondary serving cell, wherein the preset frequency band is the same as the frequency band of the target secondary serving cell.

Optionally, the second processor 700 is further configured for: configuring, to the terminal, correspondence relationship between different serving cells and reference signals for monitoring the beam failure of the serving cells, wherein the correspondence relationship is determined by the second processor 700; and/or sending parameter information, respectively configured for different secondary serving cells, of reference signals for monitoring a beam failure of a secondary serving cell, to the terminal, wherein parameter information of reference signals for monitoring a beam failure of a secondary serving cell is obtained by the second processor 700.

In FIG. 6, a bus architecture may include any number of interconnected buses and bridges, and connects various circuits including one or more processors represented by the second processor 700 and a storage represented by the second storage 720. The bus architecture may also connect various other circuits such as peripherals, voltage regulators and power management circuits, which are well known in the art. Therefore, a detailed description thereof is omitted herein. A bus interface provides an interface. The second transceiver 710 may be multiple elements, such as a transmitter and a receiver, to allow for communication with various other apparatuses on the transmission medium. The second processor 700 is responsible for supervising the bus architecture and normal processing and the second storage 720 may store the data being used by the second processor 700 during operation.

It is understood by those skilled in the art that all or a part of the steps of the aforementioned embodiments may be implemented through hardware, or through a program configured to instruct relevant hardware, wherein the program includes instructions configured to perform a part or all of the steps of the aforementioned method. The program may be stored in a readable storage medium, and the storage medium may be any form of storage medium.

Additionally, it should be pointed out that, the disclosed apparatuses and methods in the present disclosure may be disassembled and/or recombined. The disassembly and/or recombination should be considered as equivalent solutions of the present disclosure. Additionally, steps for performing above series of processes may be implemented naturally in an order describing them or in a chorological order, but do not need to be implemented necessarily in the chorological order. Some steps may be performed in parallel or implemented independently from each other. Those skilled in the art may understand that an entirety, or any step or any component of the method and the device in the present disclosure may be implemented in any computing device (including a processor, a storage medium, and the like) or any network of computing devices, in a form of hardware, firmware, software, or any combination thereof. These can be achieved by those skilled in the art using their basic programming skills in light of disclosure of the present disclosure.

The objective of the present disclosure may also be achieved by a program or a set of programs executed on any computing device. The computing device may be a known general device. Thus, the objective of the present disclosure may also be implemented by means of a program product including program codes for implementing the method or the device of the present disclosure. That is, the program product also constitutes a part of the present disclosure. A storage medium storing such program product is also comprised in the present disclosure. Obviously, the storage medium may be any known storage medium, or any storage medium developed in future. It is further pointed out that, in the method and the device of the present disclosure, various steps or components may be disassembled and/or recombined. The disassembly and/or recombination should be considered as equivalent solutions of the present disclosure. Additionally, steps for performing above series of processes may be implemented naturally in an order describing them or in a chorological order, but do not need to be implemented necessarily in the chorological order. Some steps may be performed in parallel or implemented independently from each other.

The above provides optional embodiments of the present disclosure. It is pointed out that those skilled in the art may make various modifications and improvements without departing from the principle of the present disclosure. The modifications and improvements also fall in the protection scope of the present disclosure.

What is claimed is:

1. A beam failure recovery method performed by a terminal, comprising:
    monitoring a beam failure event according to a reference signal for monitoring a beam failure of a secondary serving cell;
    reporting the beam failure event to a base station and/or sending a beam failure recovery message to the base station according to a monitoring result reported by a physical layer of the terminal to a medium access control layer of the terminal, when the beam failure event is detected,
    wherein reporting the beam failure event to the base station and/or sending the beam failure recovery message to the base station according to the monitoring result reported by the physical layer of the terminal to the medium access control layer of the terminal comprises:
    reporting, to the base station, that a first secondary serving cell is subjected to beam failure and/or sending, to the base station, a beam failure recovery message for a first secondary serving cell, if the media access control layer of the terminal detects that the number of beam failure events to which the first secondary serving cell is subjected reaches a fifth preset number of times, and the terminal monitors that a signal quality of at least one third reference signal meets a preset quality requirement, wherein, the third reference signal is a reference signal for performing beam failure recovery.

2. The method according to claim 1, wherein one reference signal is capable of being simultaneously used for beam-failure-monitoring for at least two different serving cells.

3. The method according to claim 1, wherein, the reference signal comprises a reference signal, pre-configured by the base station, for monitoring the beam failure of the secondary serving cell and/or a predefined reference signal for monitoring the beam failure of the secondary serving cell.

4. The method according to claim 1, wherein monitoring the beam failure event according to the reference signal for monitoring the beam failure of the secondary serving cell comprises:
   when the physical layer of the terminal detects that a signal quality of a second reference signal is lower than a preset quality requirement, reporting, by the physical layer to the media access control layer, a monitoring result that the second reference signal is subjected to a beam failure event;
   wherein the second reference signal is one or more of reference signals for monitoring the beam failure of the secondary serving cell.

5. The method according to claim 4, wherein reporting the beam failure event to the base station and/or sending the beam failure recovery message to the base station according to the monitoring result reported by the physical layer of the terminal to the media access control layer of the terminal comprises:
   reporting, by the terminal to the base station, that the second reference signal is subjected to the beam failure and/or sending, by the terminal to the base station, a beam failure recovery message for the second reference signal, if the media access control layer of the terminal detects that the number of beam failure events to which the second reference signal is continuously subjected reaches a first preset number of times;
   or
   reporting, by the terminal to the base station, that the second reference signal is subjected to the beam failure and/or sending, by the terminal to the base station, a beam failure recovery message for the second reference signal, if the media access control layer of the terminal detects that the number of beam failure events to which the second reference signal is continuously subjected reaches a first preset number of times, and the terminal detects that a signal quality of at least one third reference signal satisfies a preset quality requirement;
   or
   then-reporting, by the terminal to the base station, that a secondary serving cell corresponding to the second reference signal is subjected to the beam failure and/or sending, by the terminal to the base station, a beam failure recovery message for the secondary serving cell corresponding to the second reference signal, if the media access control layer of the terminal detects that the number of beam failure events to which the second reference signal is continuously subjected reaches a second preset number of times;
   or,
   reporting, by the terminal to the base station, that a secondary serving cell corresponding to the second reference signal is subjected to beam failure or sending, by the terminal to the base station, a beam failure recovery message for the secondary serving cell corresponding to the second reference signal, if the media access control layer of the terminal detects that the number of beam failure events to which the second reference signal is continuously subjected reaches a second preset number of times, and the terminal detects that a signal quality of at least one third reference signal meets a preset quality requirement;
   or
   determining, by the media access control layer of the terminal according to the monitoring result that the second reference signal is subjected to the beam failure event, whether the first secondary serving cell is subjected to the beam failure event;
   reporting, by the terminal to the base station, that the first secondary serving cell is subjected to beam failure and/or sending, by the terminal to the base station, a beam failure recovery message for the first secondary serving cell if the medium access control layer of the terminal detects that the number of beam failure events to which the first secondary serving cell is continuously subjected reaches a third preset number of times, or
   reporting, by the terminal to the base station, that the first secondary serving cell is subjected to beam failure and/or sending, by the terminal to the base station, a beam failure recovery message for the first secondary serving cell if the media access control layer of the terminal detects that the number of beam failure events to which the first secondary serving cell is continuously subjected reaches a third preset number of times, and the terminal detects that the signal quality of at least one third reference signal satisfies a preset quality requirement; or
   reporting, by the terminal to the base station, that the first secondary serving cell is subjected to beam failure and/or sending, by the terminal to the base station, a beam failure recovery message for the first secondary serving cell, if the media access control layer of the terminal detects that the number of beam failure events to which each of a predefined number of fourth reference signals is continuously subjected reaches a fourth preset number of times;
   or
   then reporting, by the terminal to the base station, that the first secondary serving cell is subjected to beam failure and/or sending, by the terminal to the base station, a beam failure recovery message for the first secondary serving cell, if the media access control layer of the terminal detects that the number of beam failure events to which each of a preset number of fourth reference signals is continuously subjected reaches a fourth preset number of times, and the terminal detects that a signal quality of at least one third reference signal meets a preset quality requirement,
   wherein the preset number is less than or equal to the total number of reference signals for monitoring the beam failure of the first secondary serving cell, the third reference signal is a reference signal for performing beam failure recovery, and the fourth reference signals are reference signals for monitoring the beam failure of the first secondary serving cell.

6. The method according to claim 1, wherein monitoring the beam failure event according to the reference signal for monitoring the beam failure of the secondary serving cell comprises:
   when the physical layer of the terminal detects that the number of fourth reference signals having a signal quality lower than a preset quality requirement reaches a preset number, reporting, by the physical layer to the media access control layer, a monitoring result that the first secondary serving cell is subjected to a beam failure event, wherein the fourth reference signal is a reference signal for monitoring a beam failure of the first secondary serving cell;

the preset number is less than or equal to the total number of reference signals for monitoring the beam failure of the first secondary serving cell.

7. The method according to claim 6, wherein reporting the beam failure event to the base station by the terminal, and/or sending the beam failure recovery message to the base station by the terminal according to the monitoring result reported by the physical layer to the medium access control layer comprises:

reporting, by the terminal to the base station, that the first secondary serving cell is subjected to the beam failure and/or sending, by the terminal to the base station, the beam failure recovery message for the first secondary serving cell if the media access control layer of the terminal detects that the number of beam failure events to which the first secondary serving cell is continuously subjected reaches a fifth preset number of times.

8. The method according to claim 1, wherein monitoring the beam failure event according to the reference signal for monitoring the beam failure of the secondary serving cell comprises:

when the physical layer of the terminal detects that a signal quality of a second reference signal is lower than a preset quality requirement, reporting, by the physical layer to the media access control layer, a monitoring result that a secondary serving cell corresponding to the second reference signal is subjected to a beam failure event;

wherein, the second reference signal is one or more of reference signals for monitoring the beam failure of the secondary serving cell corresponding to the second reference signal.

9. The method according to claim 1, wherein before monitoring the beam failure event according to the reference signal for monitoring the beam failure of the secondary serving cell, the method further comprises:

receiving configuration information, sent by the base station, of a reference signal for monitoring a beam failure of a serving cell; wherein the configuration information comprises correspondence relationship between different serving cells and reference signals for monitoring a beam failure of serving cells.

10. The method according to claim 1, wherein before monitoring the beam failure event according to the reference signal for monitoring the beam failure of the secondary serving cell, the method further comprises:

receiving configuration information, sent by the base station, of a reference signal for monitoring a beam failure of a serving cell, wherein the configuration information comprises parameter information of reference signals, corresponding to different serving cells, for monitoring a beam failure of serving cells.

11. A beam failure recovery method performed by a base station, comprising:

receiving a beam failure event reported by a terminal when the beam failure event is detected according to a reference signal for monitoring a beam failure of a secondary serving cell and/or receiving a beam failure recovery message sent by a terminal when the beam failure event is detected according to a reference signal for monitoring a beam failure of a secondary serving cell, wherein receiving the beam failure event reported by the terminal comprises:

receiving from the terminal that a first secondary serving cell is subjected to beam failure, if a media access control layer of the terminal detects that the number of beam failure events to which the first secondary serving cell is subjected reaches a fifth preset number of times, and the terminal monitors that a signal quality of at least one third reference signal meets a preset quality requirement;

receiving the beam failure recovery message sent by the terminal comprises:

receiving the beam failure recovery message for the first secondary serving cell from the terminal, if the media access control layer of the terminal detects that the number of beam failure events to which the first secondary serving cell is subjected reaches the fifth preset number of times, and the terminal monitors that the signal quality of at least one third reference signal meets a preset quality requirement.

12. The method according to claim 11, wherein one reference signal is capable of being simultaneously used for beam-failure-monitoring for at least two different serving cells.

13. The method according to claim 11, wherein, the reference signal comprises a reference signal, pre-configured by the base station, for monitoring the beam failure of the secondary serving cell and/or a predefined reference signal for monitoring the beam failure of the secondary serving cell.

14. The method according to claim 11, wherein the beam failure event indicates that a second reference signal is subjected to a beam failure, and/or the beam failure recovery message is a beam failure recovery message for a second reference signal; the second reference signal is one or more of reference signals for monitoring the beam failure of the secondary serving cell;

after receiving the beam failure event reported by the terminal when the beam failure event is detected according to the reference signal for monitoring the beam failure of the secondary serving cell and/or receiving the beam failure recovery message sent by the terminal when the beam failure event is detected according to the reference signal for monitoring the beam failure of the secondary serving cell, the method further comprises:

sending the beam failure recovery response for the second reference signal to the terminal.

15. The method according to claim 11, wherein after receiving the beam failure event reported by the terminal when the beam failure event is detected according to the reference signal for monitoring the beam failure of the secondary serving cell and/or receiving the beam failure recovery message sent by the terminal when the beam failure event is detected according to the reference signal for monitoring the beam failure of the secondary serving cell, the method further comprises:

sending a beam failure recovery response for the first secondary serving cell to the terminal.

16. The method according to claim 11, wherein, before receiving the beam failure event reported by the terminal when the beam failure event is detected according to the reference signal for monitoring the beam failure of the secondary serving cell and/or receiving the beam failure recovery message sent by the terminal when the beam failure event is detected according to the reference signal for monitoring the beam failure of the secondary serving cell, the method further comprises:
- determining correspondence relationship between different serving cells and reference signals for monitoring a beam failure of the serving cells;
- configuring the correspondence relationship to the terminal; and/or
- obtaining parameter information of a reference signal for monitoring a beam failure of a serving cell;
- sending, to the terminal, parameter information of reference signals respectively configured for the different serving cells.

17. A terminal, comprising:
a first transceiver, a first storage, a first processor and a program stored on the first storage and executable by the first processor, wherein the first processor is configured to execute the program to perform following:
monitoring a beam failure event according to a reference signal for monitoring a beam failure of a secondary serving cell; and
reporting the beam failure event to a base station and/or sending a beam failure recovery message to the base station according to a monitoring result reported by a physical layer of the terminal to a medium access control layer of the terminal, when the beam failure event is detected by the first processor,
wherein reporting the beam failure event to the base station and/or sending the beam failure recovery message to the base station according to the monitoring result reported by the physical layer of the terminal to the medium access control layer of the terminal comprises:
reporting, to the base station, that a first secondary serving cell is subjected to beam failure and/or sending, to the base station, a beam failure recovery message for a first secondary serving cell, if the media access control layer of the terminal detects that the number of beam failure events to which the first secondary serving cell is subjected reaches a fifth preset number of times, and the terminal monitors that a signal quality of at least one third reference signal meets a preset quality requirement,
wherein, the third reference signal is a reference signal for performing beam failure recovery.

18. A base station, comprising:
a second transceiver, a second storage, a second processor and a program stored on the second storage and executable by the second processor, wherein the second processor is configured to execute the program to perform the beam failure recovery method according to claim 15.

* * * * *